United States Patent
Ohuchi et al.

[19]

[11] Patent Number: 6,073,611
[45] Date of Patent: Jun. 13, 2000

[54] CONTROL APPARATUS FOR INTERNAL COMBUSTION ENGINE

[75] Inventors: Hirofumi Ohuchi; Hironori Matsumori; Wataru Fukui; Hideaki Katashiba, all of Tokyo; Takeshi Kitao, Hyogo, all of Japan

[73] Assignee: Mitsubishi Denki Kabushiki Kaisha, Tokyo, Japan

[21] Appl. No.: 09/017,876

[22] Filed: Feb. 3, 1998

[30] Foreign Application Priority Data

Oct. 14, 1997 [JP] Japan ................................ 9-280708

[51] Int. Cl.[7] .................................................. F02M 51/00
[52] U.S. Cl. ........................ 123/435; 123/1 A; 123/406.3
[58] Field of Search ................................ 123/435, 406.3, 123/406.31, 1 A; 701/104

[56] References Cited

U.S. PATENT DOCUMENTS

| | | | |
|---|---|---|---|
| 5,271,268 | 12/1993 | Ikeuchi et al. | |
| 5,515,280 | 5/1996 | Suzuki | 123/1 A |
| 5,711,272 | 1/1998 | Maegawa et al. | 123/1 A |
| 5,755,206 | 5/1998 | Takahashi et al. | 123/435 |
| 5,868,117 | 2/1999 | Moote et al. | 123/1 A |
| 5,878,717 | 3/1999 | Zur Loye | 123/435 |
| 5,904,127 | 5/1999 | Kemmler et al. | 123/435 |
| 5,950,599 | 9/1999 | Rotramel et al. | 123/1 A |
| 5,957,094 | 9/1999 | Krausman et al. | 123/1 A |

FOREIGN PATENT DOCUMENTS 6-611   1/1994   Japan .

*Primary Examiner*—Erick R. Solis
*Attorney, Agent, or Firm*—Sughrue, Mion, Zinn, Macpeak & Seas, PLLC

[57] ABSTRACT

A control apparatus for an internal combustion engine comprises: driving state detecting means for detecting a driving state of the internal combustion engine based on detected information from various sensors; control calculating means for calculating a control parameter of the internal combustion engine in accordance with the driving state; combustion state detecting means for detecting a combustion state amount of at least one of cylinders of the internal combustion engine; fuel property calculating means for calculating a property of a fuel supplied to the internal combustion engine based on the driving state and the combustion state amount; and parameter correcting means for correcting the control parameter in accordance with the fuel property. With this arrangement, it is possible to calculate the fuel property from an actual combustion state without using a sensor, and to correct the control parameter in accordance with the fuel property, thereby suppressing a deterioration of an exhaust gas, and enhancing a drivability.

20 Claims, 24 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine for controlling to correct an influence of a fuel property, and more particularly, to a control apparatus for an internal combustion engine to calculate the fuel property based on an actual combustion state without using a property sensor, so as to suppress a deterioration of an exhaust gas and to enhance a drivability by correcting a control parameter in accordance with the fuel property.

2. Description of the Related Art

FIG. 22 schematically shows a structure of a conventional control apparatus for an internal combustion engine. In FIG. 22, the internal combustion engine, i.e., an engine 1 discharges an exhaust gas by burning an intake air (mixed gas) in which a fuel is ejected.

A suction pipe 2 connected to an intake side of the engine 1 takes in an air in the atmosphere and supplies the air to the engine 1. An air cleaner 2a mounted to a suction port of the suction pipe 2 removes rubbishes and dusts in the atmosphere for cleaning the intake air to the engine 1. An air flow sensor 31 provided in the suction pipe 2 detects an amount of intake air (intake amount) Qa.

A throttle valve 4 provided in the suction pipe 2 interlockingly operates with an accelerator pedal (not shown) such as to adjust a passage area and control the amount of intake air which passes through the suction pipe 2.

An intake manifold 5 provided at downstream of the suction pipe 2 uniformly supplies the air inhaled through the throttle valve 4 to each of cylinders of the engine 1.

An exhaust pipe 6 connected to an exhaust side of the engine 1 discharges an exhaust gas generated after the combustion in the engine 1. A catalyst 7 provided in the exhaust pipe 6 purifies the exhaust gas by a chemical reaction and discharges the same into the atmosphere.

A throttle opening degree sensor 8 provided in the throttle valve 4 detects a throttle opening degree $\theta$. A crank angle sensor 9 provided on a crankshaft of the engine 1 generates a crank angle signal SGT which indicates a crank angle reference position for each of the cylinders.

A camshaft which synchronously rotates with the crankshaft at a rotational ratio of 1:2 is provided with a known cylinder identify sensor (not shown) which generates a cylinder identify signal.

An injector 10 provided in the intake manifold 5 ejects a fuel into the intake air which is just before inhaled into the engine 1, and mixes into the mixed gas.

An air-fuel ratio sensor 11 provided in the exhaust pipe 6 detects a density of oxygen contained in the exhaust gas for generating an air-fuel ratio information F.

The air flow sensor 3, the throttle opening degree sensor 8, the crank angle sensor 9 and the air-fuel ratio sensor 11 constitute various sensors for detecting the driving state of the engine 1.

The intake amount Qa, the throttle opening degree $\theta$, the crank angle signal SGT and the air-fuel ratio information F are detected information which indicates the operation state. The crank angle signal SGT is also used as a signal which indicates the number or revolutions of the engine 1.

An ECU (electric controlling unit) 12 comprising a microcomputer calculates a control parameter of the engine 1 based on the detected information Qa, $\theta$, SGT and F from the various sensors 3, 8, 9 and 11, and outputs control signals J and P with respect to various actuators such as an injector 10 and an ignition apparatus 20.

The ignition apparatus 20 including an ignition coil and an igniter applies a high voltage to an ignition plug (not shown) in each of the cylinders of the engine 1.

The injector 10 is driven by the fuel injection signal J from the ECU 12, and the ignition apparatus 20 is driven by the ignition signal P from the ECU 12.

Although it is not shown in the drawings here, for detecting the driving state, there are provided various sensors such as a water temperature sensor for detecting a cooling water temperature of the engine 1, and pressure sensor for detecting pressure in the intake manifold 5 and cylinders.

Further, there are provided, as various actuators, a bypass valve and an EGR valve for controlling the intake amount at the time of idling.

FIG. 23 is a block diagram showing a detailed structure of the ECU 12 as shown in FIG. 22. In FIG. 23, a battery 13 mounted in the automobile functions as a power source for ECU 12 and various apparatuses mounted in the automobile.

An ignition key switch 14 inserted in an output terminal of the battery 13 closes when the engine 1 is actuated, and supplies an electric power output from the battery 13 to the ECU 12 and various apparatuses mounted in the automobile.

The ECU 12 takes in a detected driving state information (i.e., crank angle signal SGT, the intake amount Qa, the air-fuel ratio information F and the throttle opening degree $\theta$) from the various sensors, and calculates control parameters such as a fuel injection amount and a timing of ignition in accordance with these detected information, and outputs a fuel injection signal J to the injector 10 and the ignition signal P to the ignition apparatus 20.

The ECU 12 includes a microcomputer 100, input interface circuits (which will be referred to as input I/F) 101 to 103, an output interface circuit (which will be referred to as output I/F) and a power source circuit 105.

The microcomputer 100 constitutes control calculating means for calculating a control parameter. The input I/F 101 to 103 take in the detected information from the various sensors, and input them to the microcomputer 100. The output I/F 104 outputs the control signals J and P calculated in the microcomputer 100.

The power source circuit 105 is connected to the battery 14 through the ignition key switch 14.

The microcomputer 100 in the ECU 12 includes a CPU 200, a counter 201, a timer 202, an A/D converter 203, an input port 204, a RAM 205, a ROM 206, an output port 207 and a common bus 208. These elements 201 to 207 are connected to the CPU 200 through the common bus 208.

The CPU 200 calculates control parameters (such as control signals J and P) based on the detected information SGT, Qa, F and $\theta$ in accordance with a predetermined program in the ROM 206.

The free-running counter 201 counts various control times for measuring a rotational cycle of the engine 1.

The A/D converter 203 converts an analogue input signal via the input I/F 102 into a digital signal and inputs the same to the CPU 200.

The RAM 205 is used as a work memory when the CPU 200 calculates. Various operation programs are stored in ROM 206. The output port 207 outputs the control signals J and P or the like.

Each of the input I/F changes a wave form of the crank angle single SGT into in interrupt signal and inputs the same to the microcomputer 100. In replying to the interrupt signal, the CPU 200 in the microcomputer 100 reads a value of the counter 201, and calculates the rotational cycle of the engine 1 based on a difference between the current read value and the last time read value, and store the result in the RAM 205.

The input I/F 102 reads each of the detected information Qa, F and θ, and inputs them to the A/D converter 203 in the microcomputer 100.

The input I/F 103 reads other detected information, and inputs them to the input port 204 in the microcomputer 100.

The input I/F 104 amplifies the control signals J and P from the output port 207 and the like, and outputs them to the injector 10 and the ignition apparatus 20.

With reference to FIGS. 24 and 25, the operation for controlling the fuel injection amount by the conventional control apparatus for the internal combustion engine as shown in FIGS. 22 and 23 will be described. The description is made based on a case in which an air-fuel ratio feedback control is conducted.

FIG. 24 is a block diagram showing a functional structure of fuel injection amount calculating means 12F in the ECU 12. FIG. 25 is a wave form chart showing the operation of the fuel injection amount calculating means 12F based on the air-fuel ratio information F, and shows variations in the air-fuel ratio information F and a normal fuel injection signal CF as time passes.

In FIG. 24, the fuel injection amount calculating means 12F includes a PI controller 400, various calculators 401 to 405, and producing means 501 to 505 for producing various data values.

Further, as the occasion demands, an adder-subtracter 406 and acceleration/deceleration correction amount producing means 506 are provided.

The predetermined air-fuel ratio producing means 501 produces a predetermined air-fuel ratio Fr which is a target value. The basic fuel amount producing means 502 produces a basic fuel amount Fo to be injected from the injector 10 based on the intake amount Qa. The fuel correction amount producing means 503 produces a fuel correction amount Fc based on a warm-up state of the engine 1, enrich coefficient and the like.

The acceleration/deceleration correction amount producing means 506 produces an acceleration/deceleration correction amount Fca in accordance with an acceleration/deceleration state based on the throttle opening degree θ and the like.

The correction coefficient producing means 504 produces a correction coefficient KF for converting the fuel injection amount into a driving time of the injector 10. A useless time producing means 505 produces a useless time TF when the injector starts driving.

The substracter 401 calculates an air-fuel ratio deviation ΔF between a predetermined air-fuel ratio Fr and the air-fuel ratio information F. The PI controller calculates the correction amount CF by the air-fuel ratio feedback control based on the air-fuel ratio deviation ΔF, and when the air-fuel ratio sensor 11 is inactivated, the correction amount CF is set at 1.0.

The multiplier 402 multiplies the correction amount CF by a basic fuel amount Fo, and the multiplied result is input to the multiplier 403. The multiplier 403 multiplies the multiplied result of the multiplier 402 by the fuel correction amount Fc, and such multiplied result is input to the multiplier 404. The multiplier 404 multiplies the multiplied result of the multiplier 403 by the correction coefficient KF, and such multiplied result is input to the multiplier 405.

When the acceleration/deceleration correction is conducted, the adder-subtracter 406 adds or subtracts the acceleration/deceleration correction amount Fca to or from the multiplied result of the multiplier 403, and such calculated result is input to the multiplier 404.

The adder-subtracter 405 adds the useless time TF to the multiplied result of the multiplier 404, and the added result is output to the injector 10 as the fuel injection signal J.

At that time, the PI controller 400 which conducts the air-fuel ratio correction based on the PI control produces a correction amount based on the feedback control as shown in FIG. 25, and determines variation amounts JLR and JRL of the correction amount CF such that the air-fuel ratio becomes a theoretical air-fuel ratio (14.7) even if the air-fuel ratio information F is changed from lean to rich, or from rich to lean.

When a linear output type oxygen concentration sensor is used as the air-fuel ratio sensor 11, the air-fuel ratio target value may be changed.

The correction amount CF produced by the PI controller 400 corresponds to a normal fuel injection signal.

In the meantime, the property (composition) of a fuel injected to the engine 1 is varies depending upon a location or season in which the fuel is used, and also varies depending upon a maker. In generally, a fuel property includes a light-duty type and a heavy-duty type, and there is a fear that an inconvenient driving problem may be generated due to a difference in the fuel property.

In order to prevent such an inconvenient driving problem due to the difference in the fuel property from being generated, it is conceived that the fuel injection amount should be set higher such that the air-fuel ratio tends to be rich. However, this measure causes a problem that the fuel efficiency is deteriorated and it is not economical.

On the other hand, paying attention to the fact that there is an interrelation between the fuel property and an alcohol concentration, there is conventionally proposed a control apparatus for detecting the fuel property using an alcohol concentration sensor.

For example, in a control apparatus for an internal combustion engine described in Japanese Utility Model Registration Publication No.6-611, the control amount is corrected in accordance with the fuel property detected by an alcohol concentration sensor, thereby overcoming the problem due to the difference in fuel property.

As described above, the conventional control apparatus for an internal combustion engine has problems that if the air-fuel ratio is enriched to prevent the problem due to the difference in fuel property, the fuel efficiency is deteriorated, and if the fuel property is detected using the alcohol concentration sensor to correct the control amount, a special sensor is required and the costs are increased.

SUMMARY OF THE INVENTION

The present invention has been accomplished in view of the above described problems, and it is an object of the invention to provide a control apparatus for an internal combustion engine in which the fuel property is calculated from an actual combustion state without using sensors, thereby correcting the control parameters in accordance with the fuel property so as to suppress the deterioration of the exhaust gas and to enhance the drivability.

A control apparatus for an internal combustion engine according to the present invention comprises: driving state detecting means for detecting a driving state of the internal combustion engine based on detected information from various sensors; control calculating means for calculating a control parameter of the internal combustion engine in accordance with the driving state; combustion state detecting means for detecting a combustion state amount of at least one of cylinders of the internal combustion engine; fuel property calculating means for calculating a property of a fuel supplied to the internal combustion engine based on the driving state and the combustion state amount; and parameter correcting means for correcting the control parameter in accordance with the fuel property.

The control parameter includes a fuel injection amount supplied to each of the cylinders of the internal combustion engine.

The driving state detecting means detects a transition state which corresponds to an acceleration/deceleration driving state of the internal combustion engine, the control calculating means increases or decreases the fuel injection amount in accordance with the transition state, and the parameter correcting means corrects an increasing amount or decreasing amount of the fuel injection amount in the transition sate in accordance with the fuel property.

The various sensors include an air-fuel ratio sensor for detecting an air-fuel ratio based on a particular component in an exhaust gas of the internal combustion engine, the control calculating means includes feedback control means for feedback-controlling the fuel injection amount such that the air-fuel ratio becomes a predetermined value, and the fuel property calculating means calculates the fuel property when the fuel injection amount is feedback-controlled.

The various sensors include an air-fuel ratio sensor for detecting an air-fuel ratio based on a particular component in an exhaust gas of the internal combustion engine, the control calculating means includes feedback control means for feedback-controlling the fuel injection amount such that the air-fuel ratio becomes a predetermined value, the fuel property calculating means calculates the fuel property when the fuel injection amount is feedback-controlled, and the parameter correcting means corrects an increasing amount or decreasing amount of the fuel injection amount in the transition sate in accordance with the fuel property.

The parameter correcting means corrects the fuel injection amount when the fuel injection amount is not feedback-controlled.

The control parameter includes an igniting timing for every cylinder of the internal combustion engine.

Therein the various sensors include an air-fuel ratio sensor for detecting an air-fuel ratio based on a particular component in an exhaust gas of the internal combustion engine, the control calculating means includes feedback control means for feedback-controlling the fuel injection amount supplied to the internal combustion engine such that the air-fuel ratio becomes a predetermined value, and the fuel property calculating means calculates the fuel property when the fuel injection amount is feedback-controlled.

The control parameter includes a fuel injection amount supplied to the internal combustion engine, and an igniting timing for every cylinder of the internal combustion engine.

The control apparatus for the internal combustion engine according the present invention further includes fuel property storing means for storing the fuel property calculated by the fuel property calculating means.

The internal combustion engine includes a plurality of cylinders whose ignitions are controlled synchronously with rotation, the combustion state detecting means includes: ionic current detecting means mounted to an ignition plug of at least one corresponding cylinder among the plurality of cylinders for detecting an ionic current signal; and ionic current processing means for calculating the combustion state amount of the corresponding cylinder from the ionic current signal.

The ionic current processing means includes ionic current component detecting means for detecting an ionic current component based on the ionic current signal, and the ionic current component detecting means inputs the ionic current signal for a predetermined time period after the corresponding cylinder is ignited, and detects a value corresponding to an input level of the ionic current signal as the ionic current component.

The ionic current component comprises a main combustion integrated value of the ionic current signal, and the ionic current processing means calculates the combustion state amount from the main combustion integrated value of the ionic current signal.

The ionic current component comprises a main combustion period based on the ionic current signal of the corresponding cylinder, and the ionic current processing means calculates the combustion state amount from the main combustion period.

The fuel property calculating means includes a combustion variation processing means for statistically processing the combustion state amount under every predetermined condition, and the fuel property is calculated based on a variation amount calculated by the combustion variation processing means.

The combustion state detecting means calculates combustion state amounts during predetermined cycles, the combustion variation processing means calculates, as the variation amount, a standard variation of the combustion state amounts during the predetermined cycle.

The combustion state detecting means calculates combustion state amounts during predetermined cycles, the combustion variation amount processing means calculates, as the variation amount, an average value of the combustion state amounts during the predetermined cycles.

The combustion variation processing means calculates, as the variation amount, a ratio of a difference absolute value between the current time combustion state amount calculated during the current cycle and the last time combustion state amount calculated during the last time cycle, to an average value of the current time combustion state amount and the last time combustion state amount.

The combustion variation processing means calculates the variation amount by integrating the ratio of the difference absolute value to the average value for the number of the predetermined cycles.

The combustion variation processing means calculates, as the variation amount, a deviation between the current time combustion state amount calculated during the current cycle, and a moving average value of combustion state amount calculated during previous cycles before the current cycle.

The above objects, features and advantages of the present invention will become apparent from the following description of the preferred embodiments taken in conjunction with the accompanying drawings.

DETAILED DESCRIPTION OF THE PREFERRED EMBODIMENTS

First Embodiment

Figure 1:
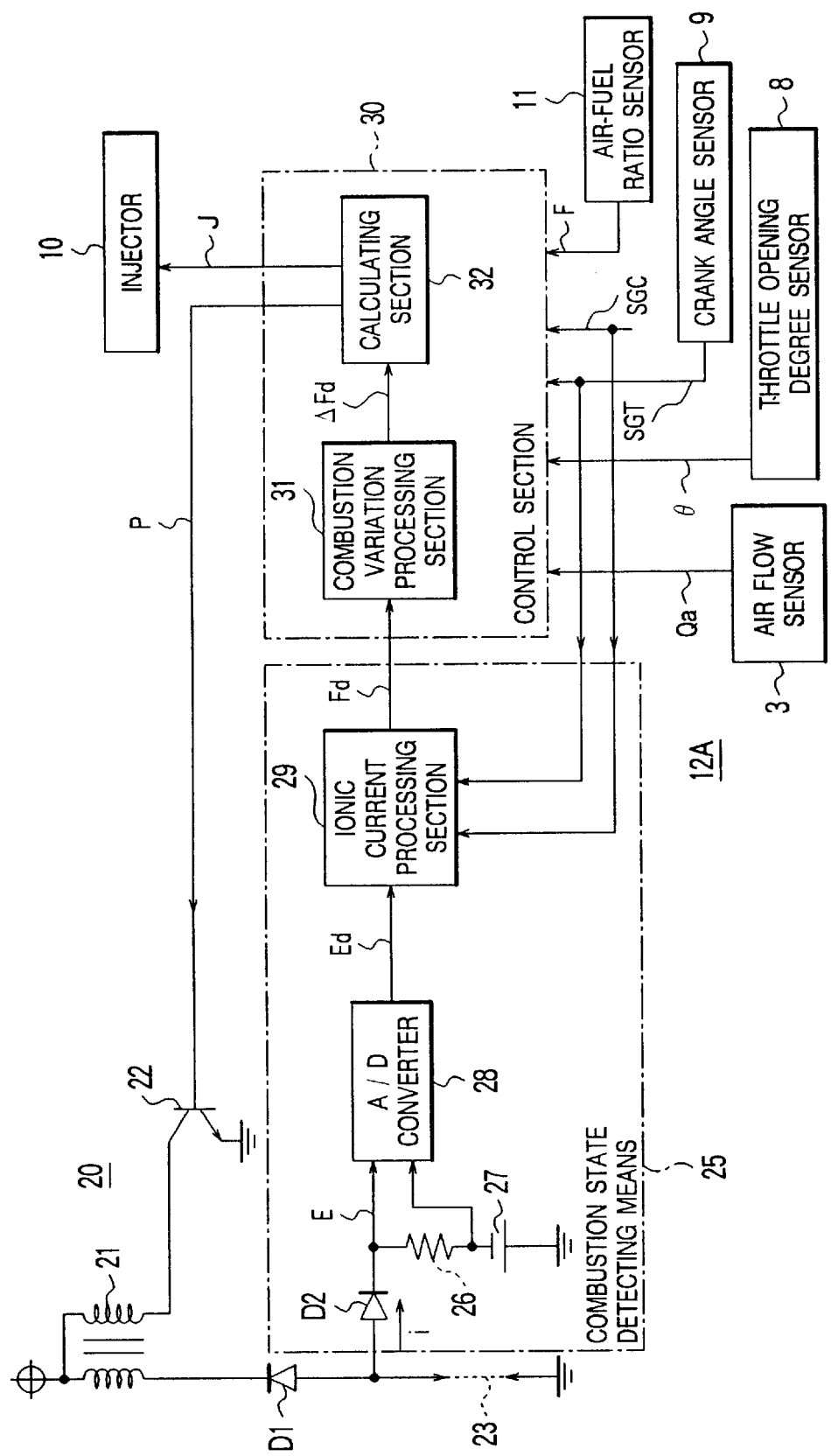
FIG. 1 is a block diagram schematically showing a structure according to a first embodiment of the present invention.

A first embodiment of the present invention will now be described with reference to the accompanying drawings. FIG. 1 is a view showing a structure of the first embodiment of the invention. In FIG. 1, elements which are similar to those described above are designated with similar reference numbers, and their detailed explanation will be omitted. Further, structures which are not illustrated are the same as those illustrated in FIGS. 22 to 24.

In the first embodiment, an igniting apparatus 20 includes an ignition coil 21 constituted by a transformer, a power transistor 22 connected to the side of a primary coil of the ignition coil 21 and grounded with emitter, an ignition plug 23 grounded at the side of a secondary coil of the ignition coil 21, and a back flow preventing diode D1 inserted between the ignition coil 21 and the ignition plug 23.

Although one ignition apparatus 20 for one cylinder is shown in order to prevent the drawing from being complicated, the ignition apparatus having the same structure is provided for every cylinder.

The ECU 12A includes combustion state detecting means 25 provided in the ignition apparatus 20 for calculating the combustion state amount Fd, and a control section 30 for calculating a fuel property (a difference in volatilization of heavy-duty component or light-duty component) based on the combustion state amount Fd for correcting a control parameter.

The combustion state detecting means 25 includes ionic current detecting means provided in the ignition plug 23 of each of cylinders (at least one corresponding cylinder) for detecting an ionic current i flowing in the ignition plug of the combustion cylinder, and an ionic current processing section 29 for calculating the combustion state amount Fd of the corresponding cylinder based on an ionic current signal Ed from the ionic current detecting means.

The ionic current detecting means includes a back flow preventing diode D2 connected to one end of the ignition plug 23, a load resistor 26 for converting the ionic current i into an electric voltage value, a DC source 27 connected to the laod resistor 26, and an A/D converter 28 for converting the ionic current signal E detected as opposite ends electric voltages of the load resistor 26 into a digital value Ed.

The ionic current processing section 29 subjects the ionic current signal E converted into the digital value Ed, to a calculation process based on the crank angle signal SGT and the cylinder identification signal SGC, thereby outputting the combustion state amount Fd for individual cylinder for every combustion cycle.

The ionic current processing section 29 includes ionic current component detecting means which inputs the ionic current signal Ed over a predetermined time period after the corresponding cylinder is ignited, and which detects an ionic current component which corresponds to an input level of the ionic current signal Ed. The ionic current processing section 29 calculates the combustion state amount Fd from the ionic current component during a main combustion time period of the corresponding cylinder.

The control section 30 includes a combustion variation processing section 31 for calculating a variation amount ΔFd of the combustion state, and a calculating section 32 for calculating the fuel property based on the variation amount ΔFd and for correcting the parameter.

The combustion variation processing section 31 includes means for statistically calculating the combustion state amount Fd which is output from the ionic current processing section 29 for every predetermined condition, and calculates the variation state of the combustion state amount Fd as the variation amount ΔFd.

As will be described later, the combustion variation processing section 31 calculates a variation amount ΔFd(n) of the combustion state amount Fd, from a current combustion state amount Fd(n) which is calculated in a current cycle (n), and from statistically processed data (such as a reference variation, an average value, a difference absolute value) based on the last combustion state amount Fd(n−j) which is calculated in the last cycle (n−j)(1≦j<n).

The calculating section 32 includes driving state detecting means for detecting the driving state based on the various sensor information F, Qa, θ, SGT and SGC, and calculates an engine control parameter in accordance with the driving state, and outputs the ignition signal P and the fuel injection signal J.

The calculating section 32 constitutes fuel property calculating means with cooperation with the combustion variation processing section 31, and corrects various control parameters based on the fuel property calculated from the variation amount ΔFd.

Here, although the control section 30 is arranged to include the fuel variation processing section 31, and to calculate the fuel property from the variation amount ΔFd of the combustion state, the combustion variation processing section 31 may be omitted, and the fuel property may be calculated directly from arbitrary combustion state amount Fd (e.g., known ionic current component such as a peak value, an integrated value ionic current during the main combustion).

Figure 2:
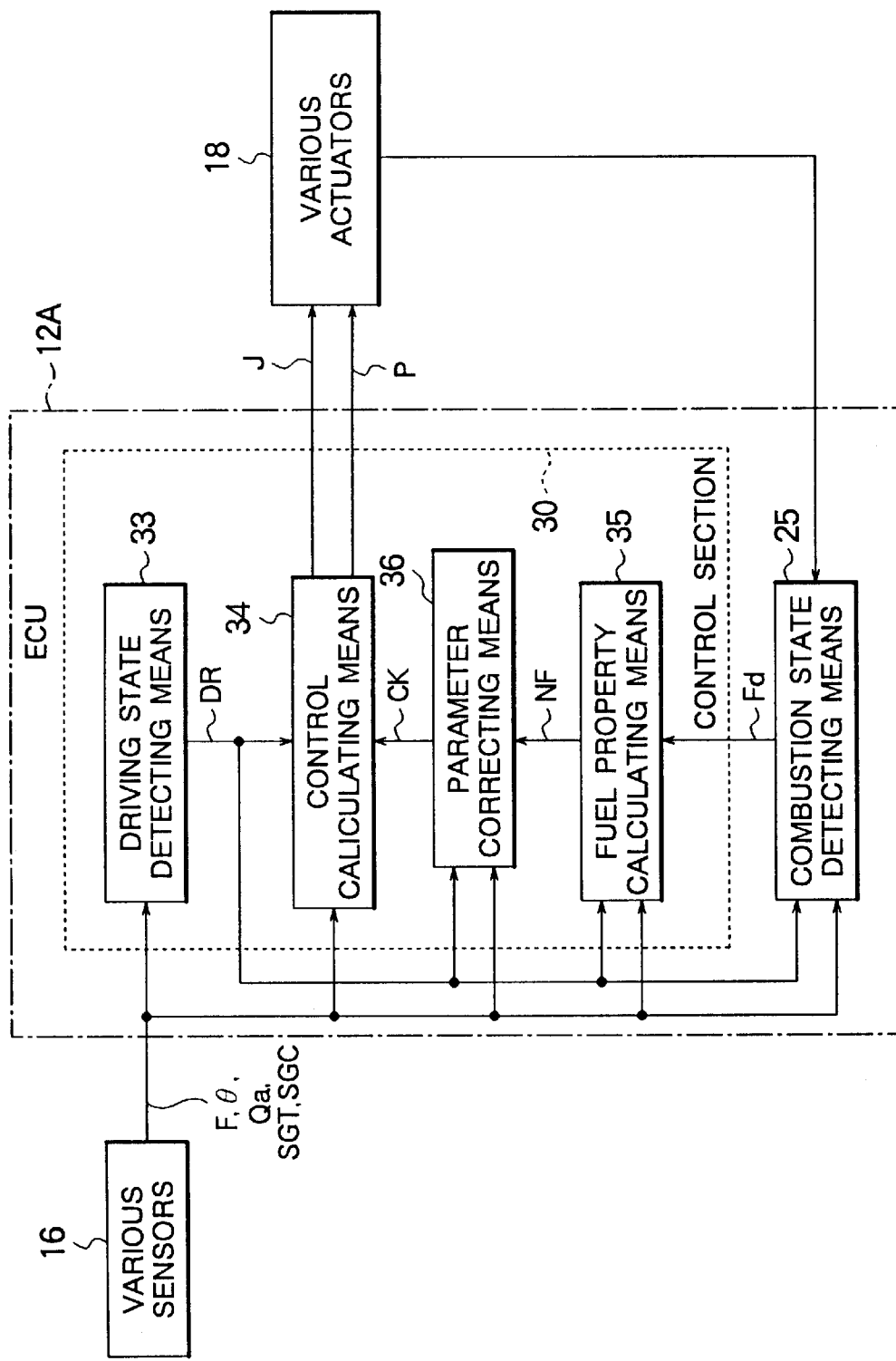
FIG. 2 is a block diagram showing a functional structure according to the first embodiment of the invention.

FIG. 2 is a block diagram showing a functional structure of the ECU 12A, and the same elements as those described above will be designated by the same reference numbers, and their detailed descriptions will be omitted.

In FIG. 2, the various sensors 16 include the above-mentioned air flow sensor 3 (see FIG. 22), the throttle opening degree sensor 8 and the like, and the various actuators 18 include the above-mentioned injector 10 and the ignition apparatus 20.

The control section 30 in the ECU 12A includes: driving state detecting means 33 for detecting an driving state DR based on the various sensor information F, Qa, θ, SGT and SGC; control calculating means 34 for calculating the control parameters J and P in accordance with the driving state DR; fuel property calculating means 35 for calculating a fuel property NF based on the combustion state amount Fd; and parameter correcting means 36 for outputting a correction signal CK of the control parameters Ja and P in accordance with the fuel property NF.

Next, the operation of the fuel injection amount correction according to the first embodiment of the invention as shown in FIGS. 1 and 2 will be described with reference to a flowchart of FIG. 3 (fuel control algorithm), an explanatory view of FIG. 4 (fuel property calculating operation) and an explanatory view of FIG. 5 (correcting operation in accordance with the fuel property).

In this case, the parameter correcting means 36 in the ECU 12A includes fuel injection amount correcting means, and produces the correction signal CK for correcting the fuel injection signal J (fuel injection amount) in accordance with the driving state DR and the fuel property NF.

Figure 3:
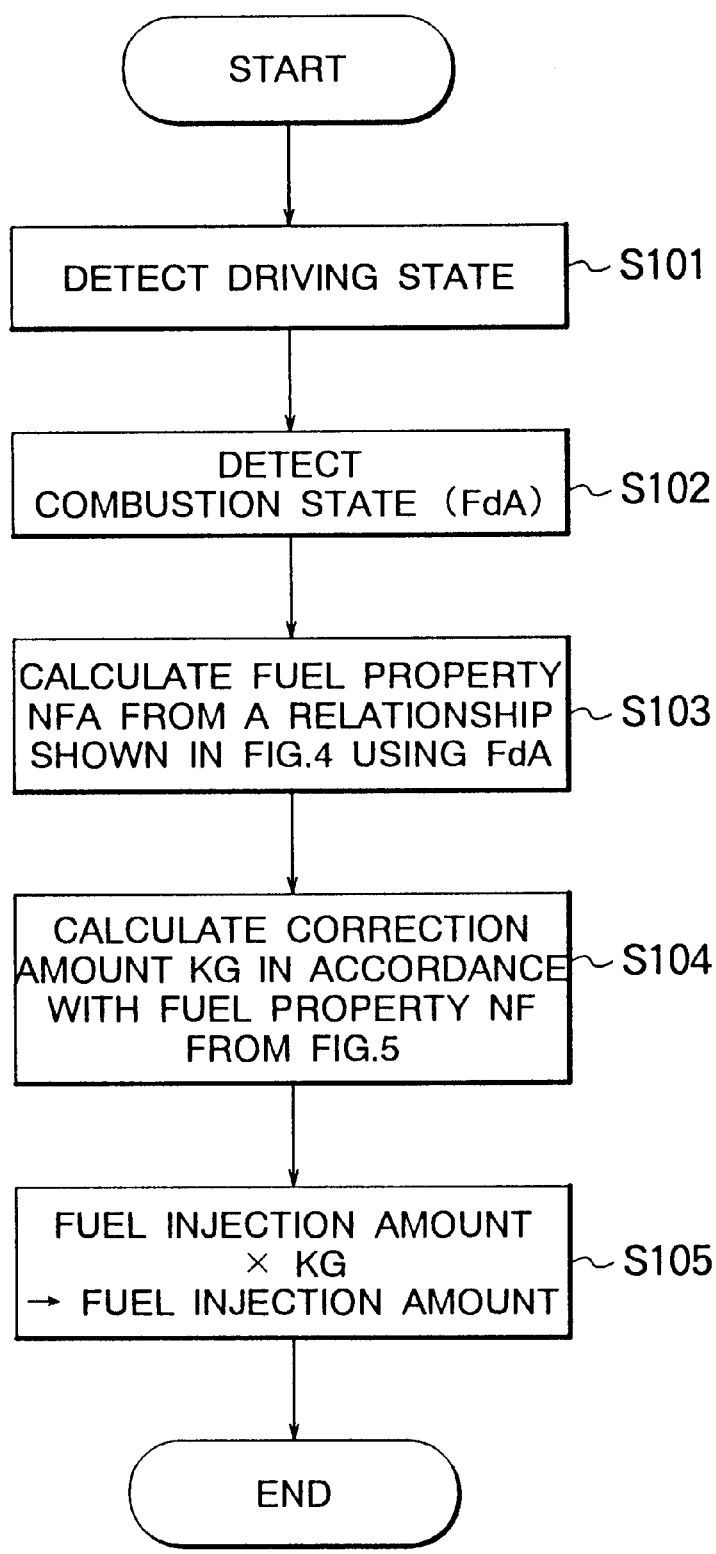
FIG. 3 is a flowchart showing a fuel injection amount correcting operation according to the first embodiment of the invention.
Figure 22:
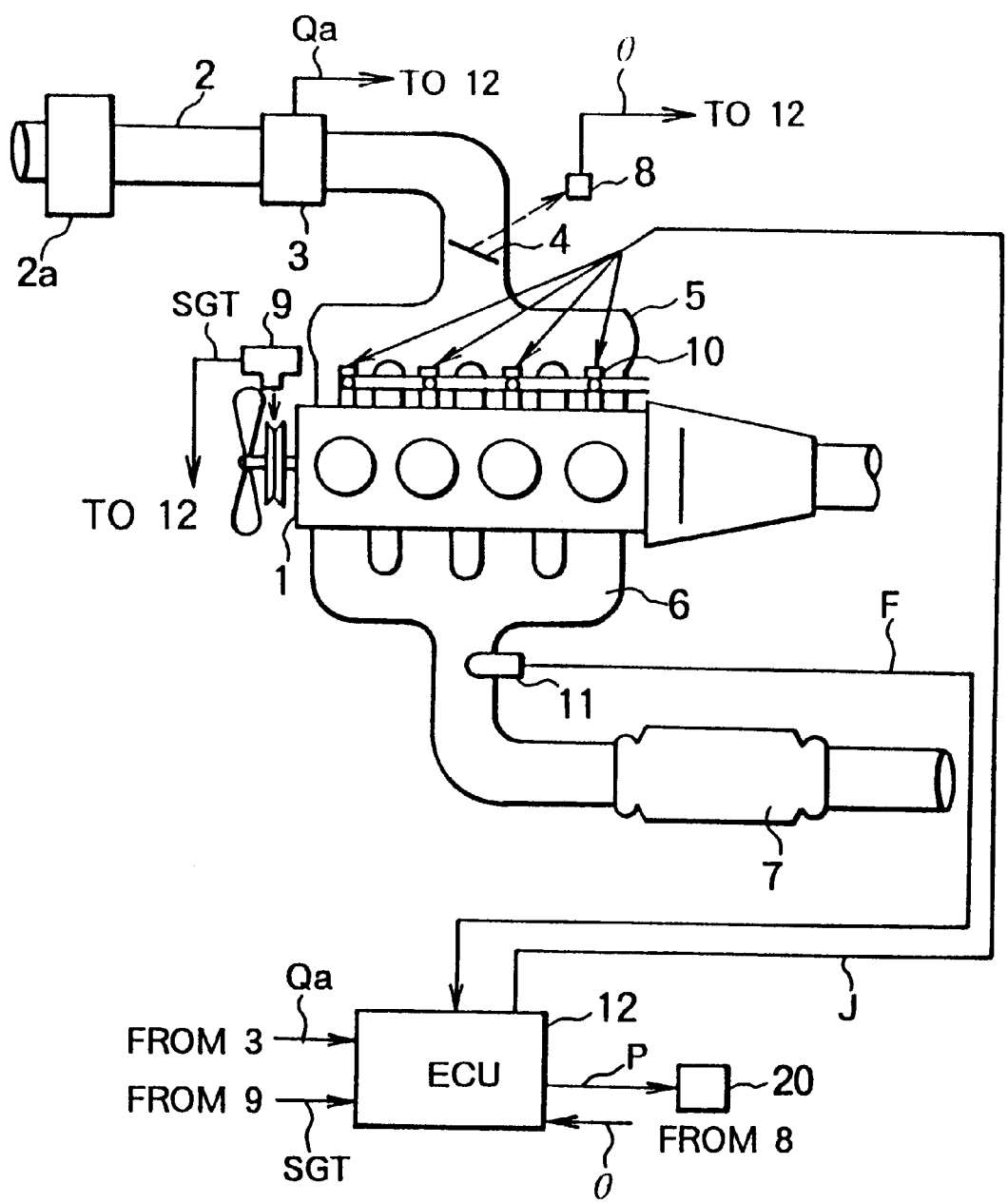
FIG. 22 is a view for schematically showing a structure of a conventional control apparatus for an internal combustion engine.
Figure 23:
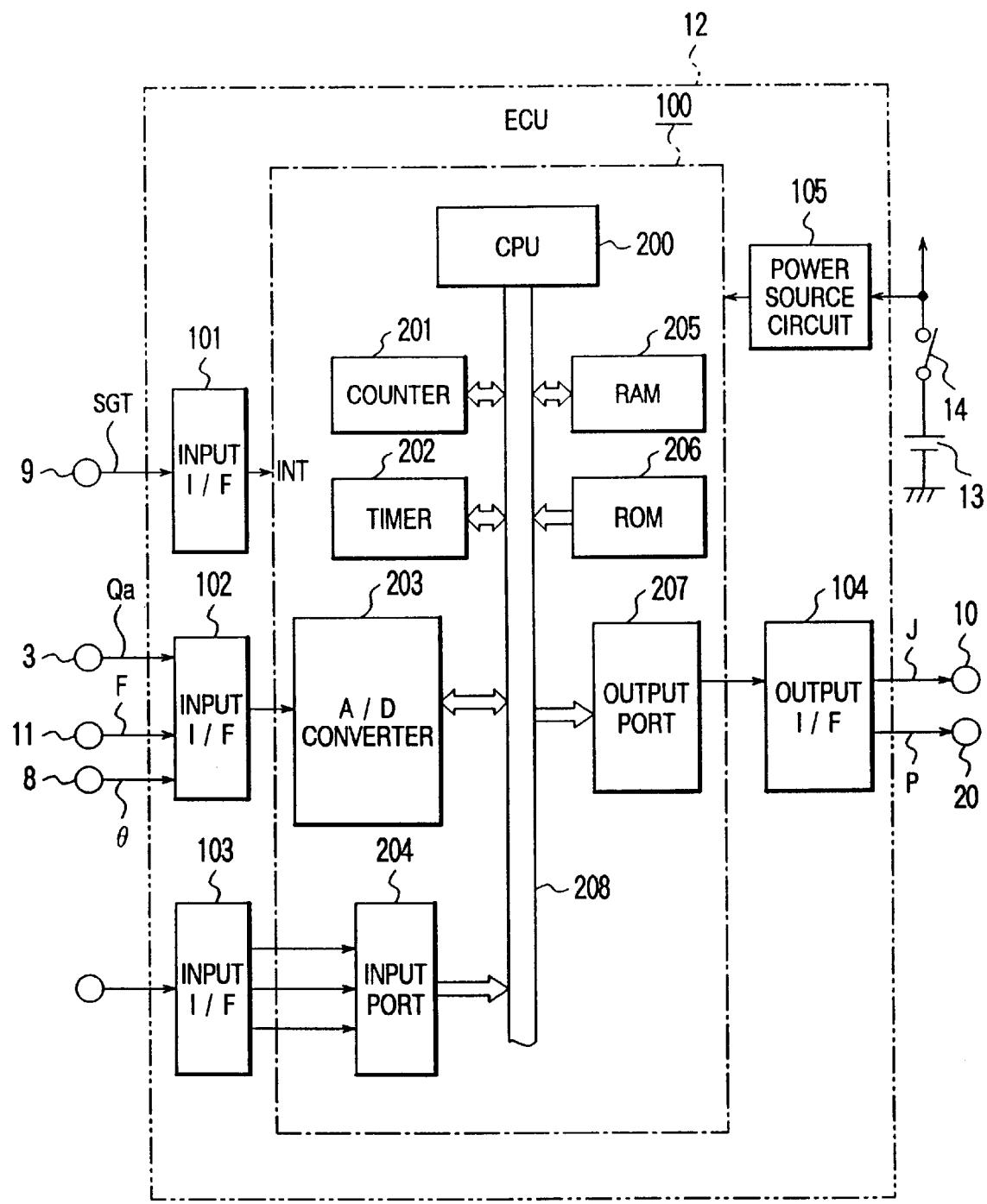
FIG. 23 a block diagram showing a structure of an ECU of the conventional control apparatus for the internal combustion engine.

The algorithm in FIG. 3 comprises software in the ROM 206 (see FIG. 23) mounted in ECU 12A, and is executed by interruption of the crank angle signal SGT or a timer signal from the engine 1 (see FIG. 22).

Figure 4:
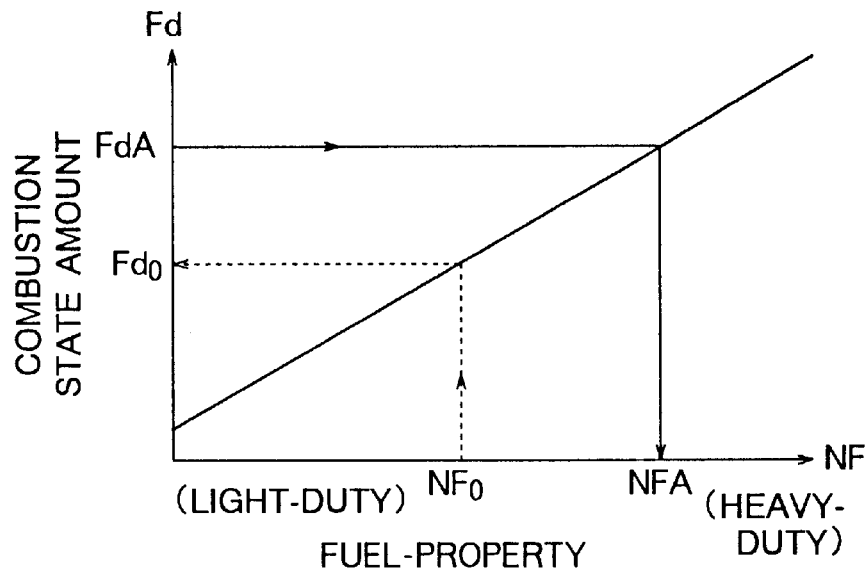
FIG. 4 is a view for explaining a fuel property calculating operation according to the first embodiment of the invention.

FIG. 4 shows a relationship between the fuel property NF and the combustion state amount Fd.

Generally, the gasoline is liable to burn slowly as the fuel property NF becomes heavier. Therefore, if the combustion state amount Fd is the period of burning, the combustion state amount Fd becomes greater as the heavy-duty component of the property NF increases.

Although the relationship shown in FIG. 4 varies depending upon the driving state DR (such as the revolution of the engine or load), it is possible to obtain the injected fuel property NF by detecting the combustion state amount Fd from the relationship in FIG. 4.

That is, because a fuel including a larger amount of heavy-duty components burns slower, the combustion state amount Fd of such fuel largely varies, e.g., increases with respect to a light-duty fuel including a smaller amount of heavy-duty components.

Further, because the combustion state amount Fd varies depending upon the driving state DR, it is necessary to previously define the relation between the fuel property NF and the combustion state amount Fd, using a standard fuel (a fuel having an intermediate property, or heavy-duty fuel or light-duty fuel) for every driving state DR.

FIG. 4 shows a case in which a substantially intermediate property NFo is determined as a standard value to provide the combustion state amount Fdo, and a fuel property NFA is associated with an arbitrary combustion state amount data FdA.

Figure 5:
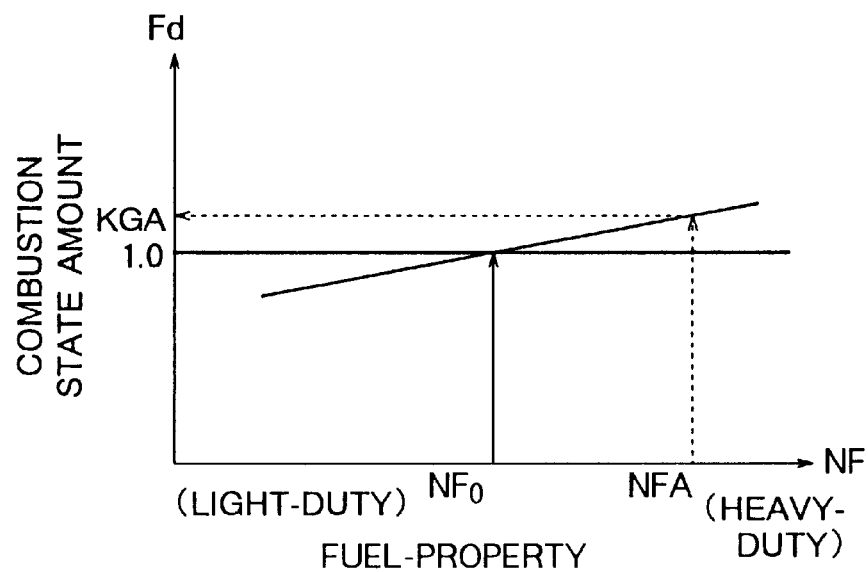
FIG. 5 is a view for explaining a fuel injection amount correcting operation according to the first embodiment of the invention.

FIG. 5 shows a correction amount KG which is set in accordance with the combustion state NF. Although the correction amount KG is set at "1.0" with respect to a fuel having a standard property NFo, the correction amount KG is set at a value greater than "1.0" with respect to a heavy-duty fuel (having a larger combustion state amount Fd) whose combustion state is inferior, so as to correct to increase the fuel injection amount.

In FIG. 3, the driving state detecting means 33 in the ECU 12A detects the driving state DR of the engine 1 from the detected information of the various sensors 16 (step S101). The driving state DR is indicated, e.g., by the intake amount Qa and the engine revolution number (which is detected from the crank angle signal SGT).

Subsequently, the ionic current detecting means in the combustion state detecting means 25 detects the ionic current i flowing through the ignition plug 23 of the combustion cylinder, and outputs the ionic current signal Ed through the A/D converter 28. The ionic current processing section 29 in the combustion state detecting means 25 calculates the combustion state amount Fd from the ionic current signal Ed, and inputs the same to the control section 30 (step S102).

Next, the fuel property calculating means 35 in the control section 30 obtains a combustion state amount data FdA (e.g., the combustion state amount Fd is used as such a data as it is, or the variation amount ΔFd is used as such a data) indicative of an ionic current component from the combustion state amount Fd, and calculates a property NFA of the fuel which is actually used, from a value of the combustion state amount data FdA and the relationship shown in FIG. 4 (step S103).

Subsequently, the parameter correcting means 36 obtains the fuel correction amount KGA from the relationship shown in FIG. 5 using the fuel property NFA obtained in step S103 (step S104), and outputs the fuel correction amount KGA as a correction signal CK. In this case, because the fuel property NFA is greater (heavier) than the standard fuel property NFo, the fuel correction amount KGA is set at a value greater than 1.0.

That is, when the fuel includes a larger amount of heavy-duty components, a volatilization of the fuel is low and an amount of fuel adhered to the intake manifold 5 (see FIG. 22) or the like is increased. Therefore, it is necessary to increase the fuel injection amount relatively.

Therefore, the initial fuel injection amount is multiplied by a correction coefficient KGA in accordance with the fuel property NFA to correct for increasing the fuel injection amount (step S105).

To the contrary, when a fuel which is used includes a large amount of light-duty components, and the fuel property NF calculated in accordance with FIG. 4 is smaller than the standard fuel property NFo, the volatilization of the fuel is high and the amount of fuel adhered to the intake manifold 5 or the like is small and thus, it is possible to decrease the fuel injection amount relatively. Therefore, the fuel correction amount (correction coefficient) KG is set at a value smaller than 1.0.

In the above-described manner, it is possible to detect the fuel property NF from the combustion state amount Fd without providing a property sensor, and to correct the fuel injection amount in accordance with the fuel property NF. Therefore it is possible to prevent a deterioration of the exhaust gas due to a difference of the fuel property and a deterioration of the drivability.

Further, because the combustion state amount Fd is detected from the ionic current i which is generated at the time of combustion, it is possible to detect the combustion state of each of the cylinders for every combustion cycle, which enhances a reliability of detection of the fuel property NF.

In the above-described combustion state detecting means 25, although the ionic current signal Ed is converted from analogue to digital and then is converted into the combustion state amount Fd, the ionic current signal E having a analogue value may be converted into the combustion state amount and then may be converted from analogue to digital for outputting the combustion state amount Fd.

Second Embodiment

Although the first embodiment has been described while taking the case in which a normal fuel injection amount is corrected, the amount of correction for increasing or reducing the fuel injection amount at the time of decelerating or decelerating driving (transitional driving) may further be corrected in accordance with the fuel property.

In generally, the driving state detecting means 33 detects an accelerating or decelerating driving state (transitional state) of the engine 1 as the driving state DR, and the control calculating means 34 corrects to increase or decrease the fuel injection amount (see FIG. 24) in accordance with the transitional state for enhancing the drivability. For example, during acceleration, the control calculating means 34 increases the fuel injection amount as compared with a normal driving, thereby securing an accelerating property.

In this case, fuel injection amount correcting means for correcting the acceleration/deceleration correcting amount in accordance with the driving state DR and the correction coefficient KG is provided in the control calculating means 34 for correcting to increase or decrease the fuel injection amount in a transitional state in response to the correction signal CK from the parameter correcting means 36. With this arrangement, it is possible to reliably maintain an excellent drivability irrespective of difference in fuel property NF.

Figure 6:
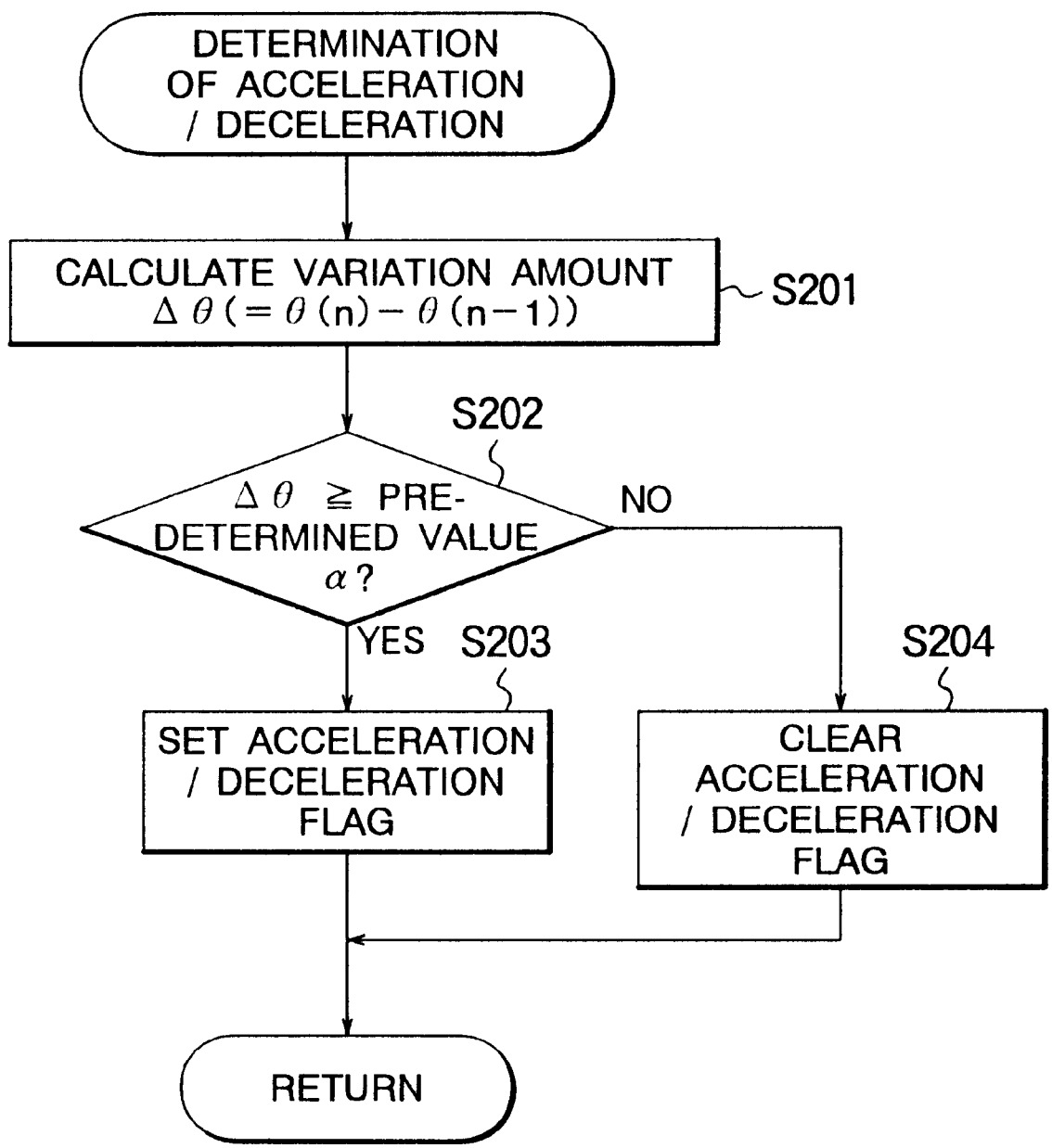
FIG. 6 is a flowchart showing a fuel injection controlling operation at the time of acceleration or deceleration according to a second embodiment of the invention.
Figure 7:
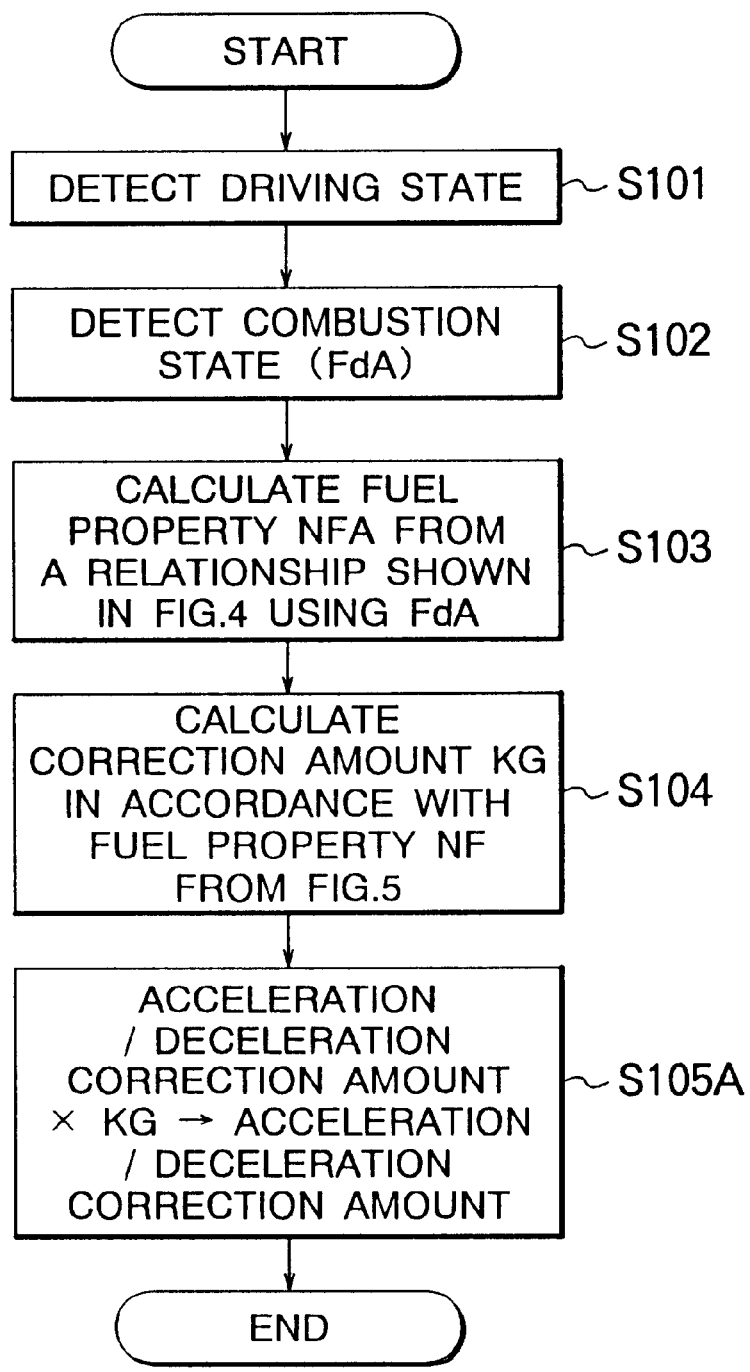
FIG. 7 is a flowchart showing a fuel injection amount correcting operation according to the second embodiment of the invention.

FIG. 6 is a flowchart showing an acceleration/deceleration determining operation by the control calculating means 34 according to the second embodiment of the present invention, and FIG. 7 is a flowchart showing a fuel injection amount correcting operation at the time of acceleration or deceleration by the control calculating means 34 of the second embodiment.

First, in FIG. 6, the control calculating means 34 calculates a variation amount $\Delta\theta$ using the last sampling value $\theta(n-1)$ and the current sampling value $\theta(n)$ in accordance with the following equation (1) (step S201):

$$\Delta\theta=\theta(n)-\theta(n-1) \tag{1}$$

Subsequently, it is determined whether or not the variation amount $\Delta\theta$ is equal to or greater than $\alpha$ (step S202). If $\Delta\theta \geq \alpha$ (i.e., Yes), an acceleration/deceleration flag is set (step S203), and if $\Delta\theta 21 \alpha$ (i.e., No), the acceleration/deceleration flag is reset (step S204).

Next, an acceleration/deceleration correcting processing is conducted in accordance with the fuel property NF shown in FIG. 7.

In FIG. 7, steps S101 to S104 are the same as those described above, and only a correction step S105 is different.

That is, the control calculating means 34 multiplies the correction coefficient KG by the fuel injection amount which is corrected for acceleration or deceleration, using the correction coefficient KG calculated in step S104, and calculates a fuel injection amount which is finally corrected for acceleration or deceleration (step S105A).

For example, at the time of acceleration, the fuel injection amount is corrected such as to be increased. However, if a heavy-duty fuel is used, the fuel which is further corrected such as to be increased by the correction coefficient KG which is greater than 1.0 is injected.

Therefore, it is possible to detect the fuel property NF from the driving state DR and the combustion state amount Fd without providing a property sensor, and it is possible to correct to suitably increase or decrease the fuel injection amount in accordance with the fuel property NF at the time of acceleration or deceleration. Thus, it is possible to prevent the deterioration of the exhaust gas due to the fuel property NF and the deterioration of the drivability at the time of acceleration or deceleration.

In step S105A, although the fuel injection amount at the time of acceleration or deceleration is multiplied by the correction coefficient KG, the correction coefficient KG may be added or subtracted. That is, at the time of acceleration, the correction coefficient KG may be added to further increase the fuel injection amount, and at the time of deceleration, the correction coefficient KG may be subtracted to further decrease the fuel injection amount, thereby providing the same effects as those described above.

Third Embodiment

In the above described first and second embodiment, although a driving condition at the time of calculation of the fuel property, the driving state during feedback control of air-fuel ratio (fuel injection amount) may be set to enhance the detection accuracy of the fuel property NF.

Figure 24:
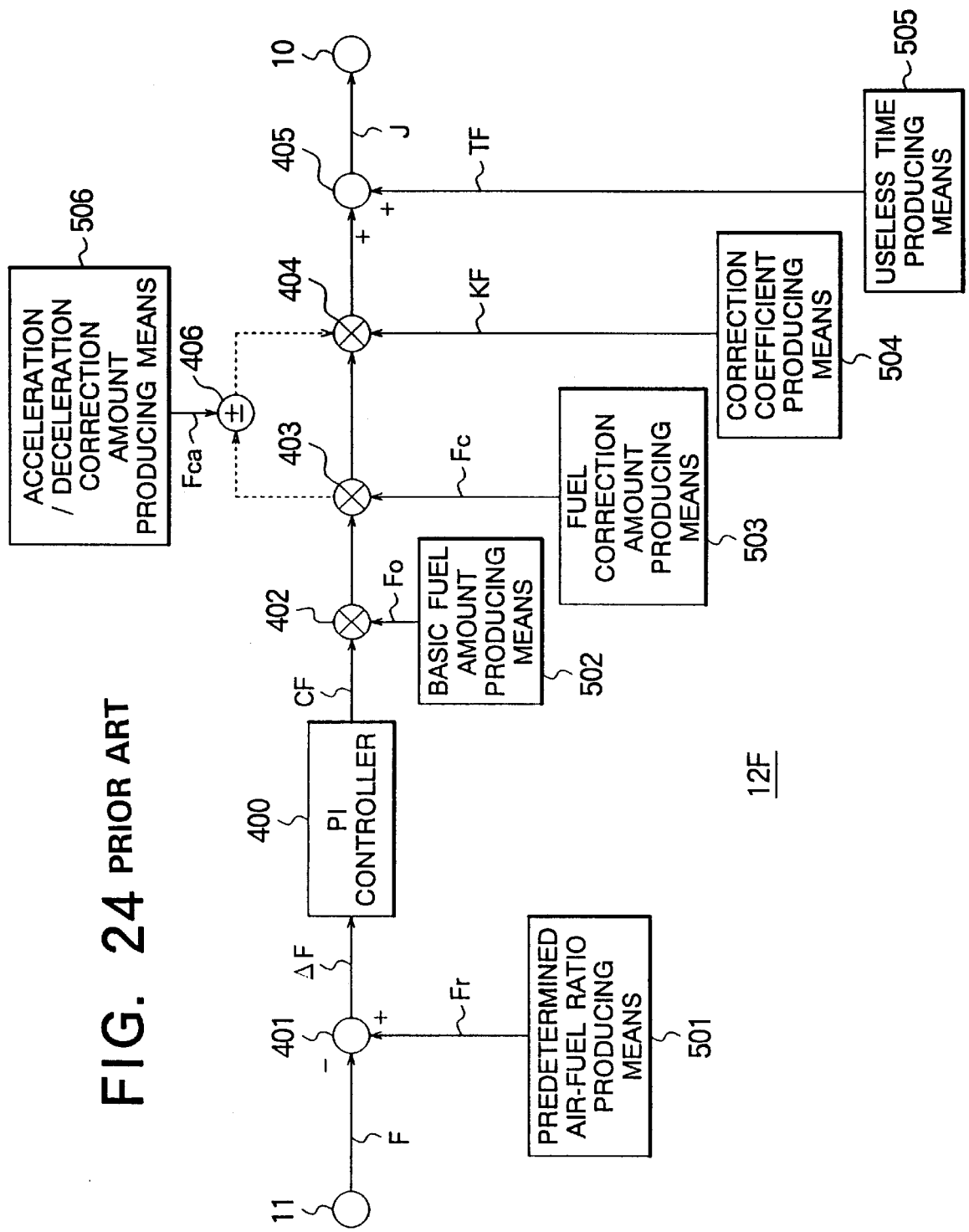
FIG. 24 is a block diagram showing a fuel control section of the conventional control apparatus for the internal combustion engine.
Figure 25:
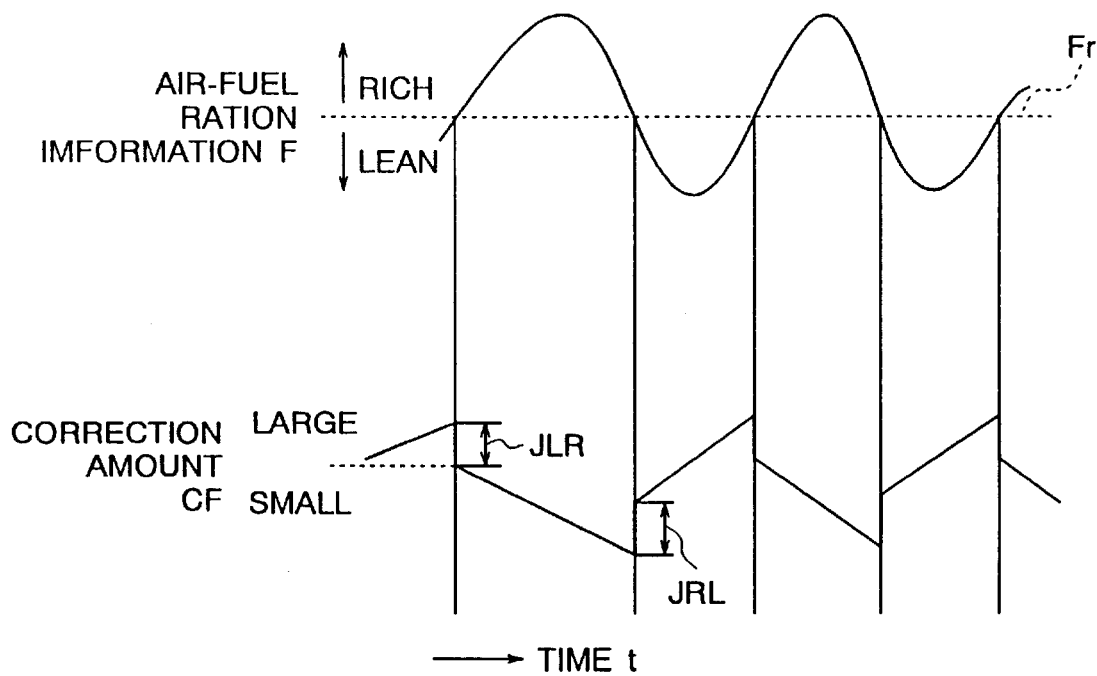
FIG. 25 is a wave form chart showing a fuel injection amount correcting operation of the conventional control apparatus for the internal combustion engine.

In generally, as described above (see FIG. 22), the various sensors 16 include the air-fuel ratio sensor 11 for detecting the air-fuel ratio F based on a certain component (oxygen concentration) in the exhaust gas of the engine 1, and the control calculating means 34 (see FIG. 2) includes feedback control means for feedback controlling the fuel injection amount such that the air-fuel ratio F becomes equal to a predetermined value (see FIGS. 24 and 25).

In this case, the fuel property calculating means 35 calculates the fuel property NF from the driving state DR and the combustion state amount Fd during feedback control (in a state where the fuel property is controlled to be a predetermined air-fuel ratio).

Therefore, the fuel injection amount correcting means in the control calculating means 34 corrects the fuel injection amount, in accordance with the correction signal CK based on the fuel property NF calculated during the feedback control, and corrects to increase or decrease the fuel injection amount in a transitional state.

Figure 8:
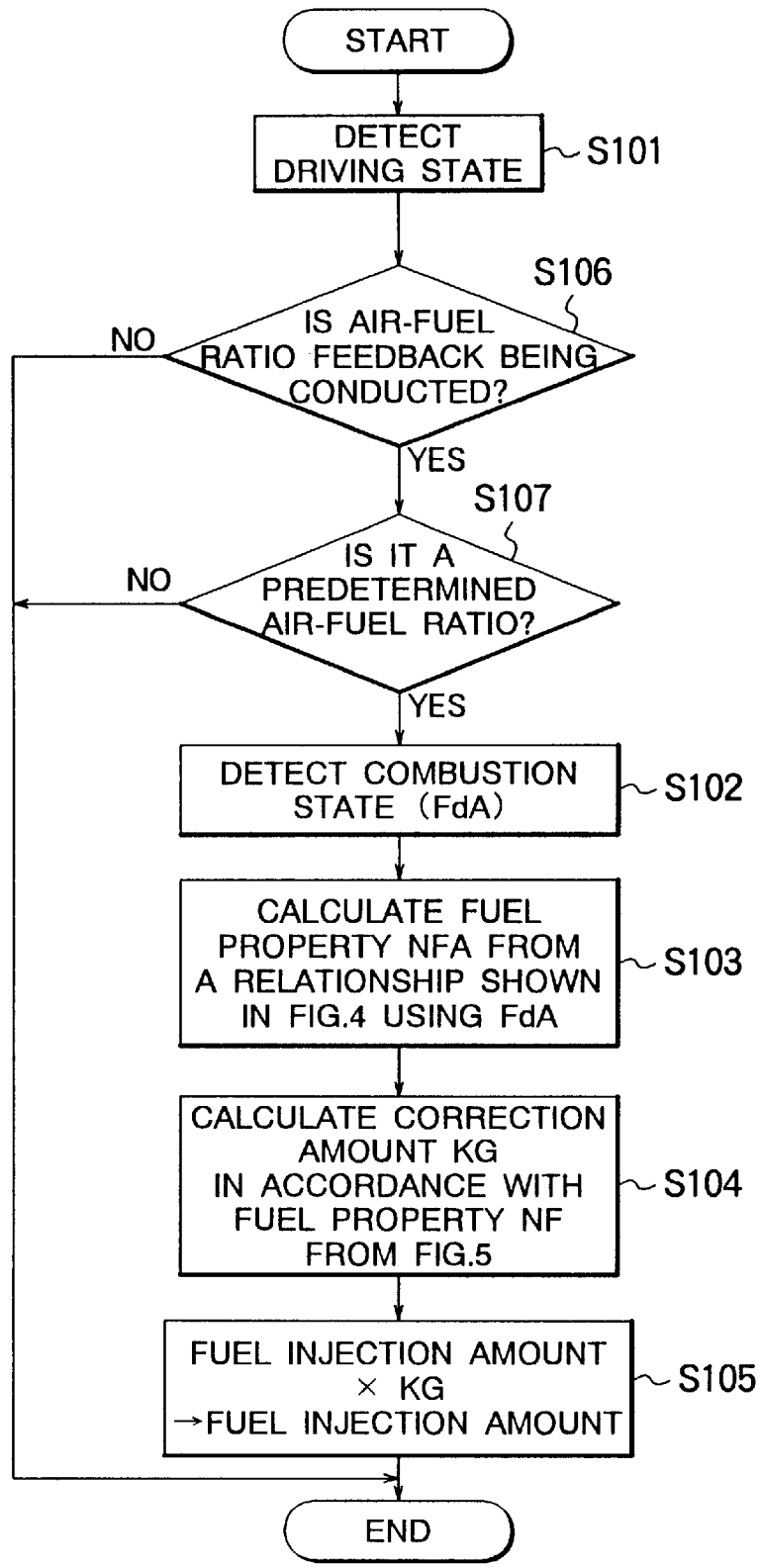
FIG. 8 is a flowchart showing a fuel injection amount correcting operation according to a third embodiment of the invention.

FIG. 8 is a flowchart showing a processing operation of the combustion state detecting means 25 and the fuel property calculating means 35 according to the third embodiment of the present invention.

In FIG. 8, steps S101 to S105 are the same as those described above (see FIG. 3), and determining steps S106 and S107 for the air-fuel feedback control are inserted between the driving state detecting step S101 and the combustion state detecting step S102.

First, after the driving state is detected (in step S101), it is determined whether or not the air-fuel feedback is being conducted (in step S106). If the air-fuel feedback is conducted (i.e., Yes), it is subsequently determined whether or not the air-fuel ratio during the feedback control is actually controlled at a predetermined theoretical air-fuel ratio (14.7) (in step S107).

In step S107, if it is determined that the air-fuel ratio during the control is equal to the predetermined air-fuel ratio (i.e., Yes), the processing is advanced to the combustion state detecting step S102.

On the other hand, if it is determined in step S106 that the air-fuel ratio feedback control is not being conducted, (i.e., No), or if it is determined in step S107 that the air-fuel ratio is not equal to the predetermined air-fuel ratio (i.e., No), remaining steps in FIG. 8 are passed through and the processing is returned.

In this manner, only when the air-fuel ratio F (fuel injection amount) is feedback controlled, the fuel property NF is calculated, thereby suppressing a detection error of the combustion state amount Fd due to an influence by variation of the air-fuel ratio F.

Therefore, it is possible to enhance the detection accuracy of the fuel property NF to further correct the fuel correction amount, and to prevent the deterioration of the exhaust gas due to a difference in fuel property and the deterioration of the drivability.

Fourth Embodiment

In the above third embodiment, although a normal fuel injection amount is corrected in accordance with the combustion state NF detected during the air-fuel feedback, the fuel injection amount during at the time of acceleration or deceleration driving (transitional driving) may be corrected.

Figure 9:
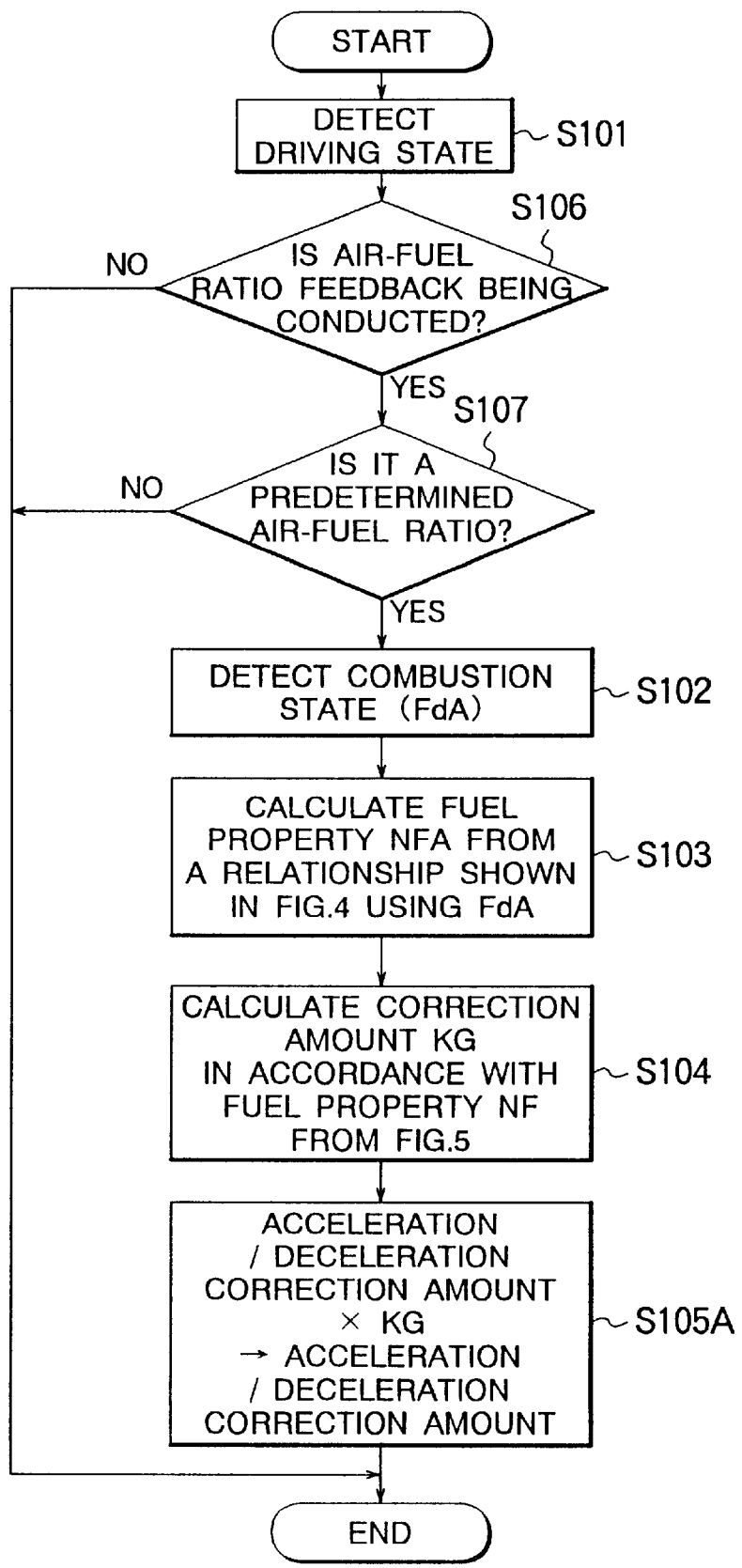
FIG. 9 is a flowchart showing a fuel injection amount correcting operation according to a fourth embodiment of the invention.

FIG. 9 is a flowchart showing the fuel injection amount correcting operation at the time of acceleration or deceleration driving according to the fourth embodiment of the present invention, which differs from the third embodiment (see FIG. 8) only in a fuel injection amount correcting operation (step S105A) at the time of the acceleration or deceleration driving.

In this case, the fuel property calculating means 35 calculates the fuel property NF from the driving state DR and the combustion state amount Fd during the air-fuel ratio feedback control. The fuel injection amount correcting means in the control calculating means 34 corrects only the fuel injection amount at the time of acceleration or deceleration based on the correction signal CK in accordance with the fuel property NF (step S105A).

With this procedures, the fuel injection amount (acceleration/deceleration correction amount) at the time of acceleration or deceleration is further corrected, and it is possible to prevent a deterioration of the exhaust gas due to a fuel property at the time of acceleration or deceleration, and the deterioration of the drivability.

Fifth Embodiment

In the above-described third embodiment, although only a driving condition at the time of calculation of the fuel property is set, and a driving condition at the time of correction of the fuel injection amount in accordance with the fuel property NF is not set, a driving state except when the air-fuel feedback control is not being conducted may be set as a correction condition of the fuel injection amount, thereby enhancing an effect obtained by correcting the fuel injection amount.

In this case, the fuel injection amount correcting means in the control calculating means 34 corrects the fuel correction amount under a driving condition in which the air-fuel ratio feedback control is not being conducted, in accordance with the fuel property NF calculated during the air-fuel ratio feedback control.

Figure 10:
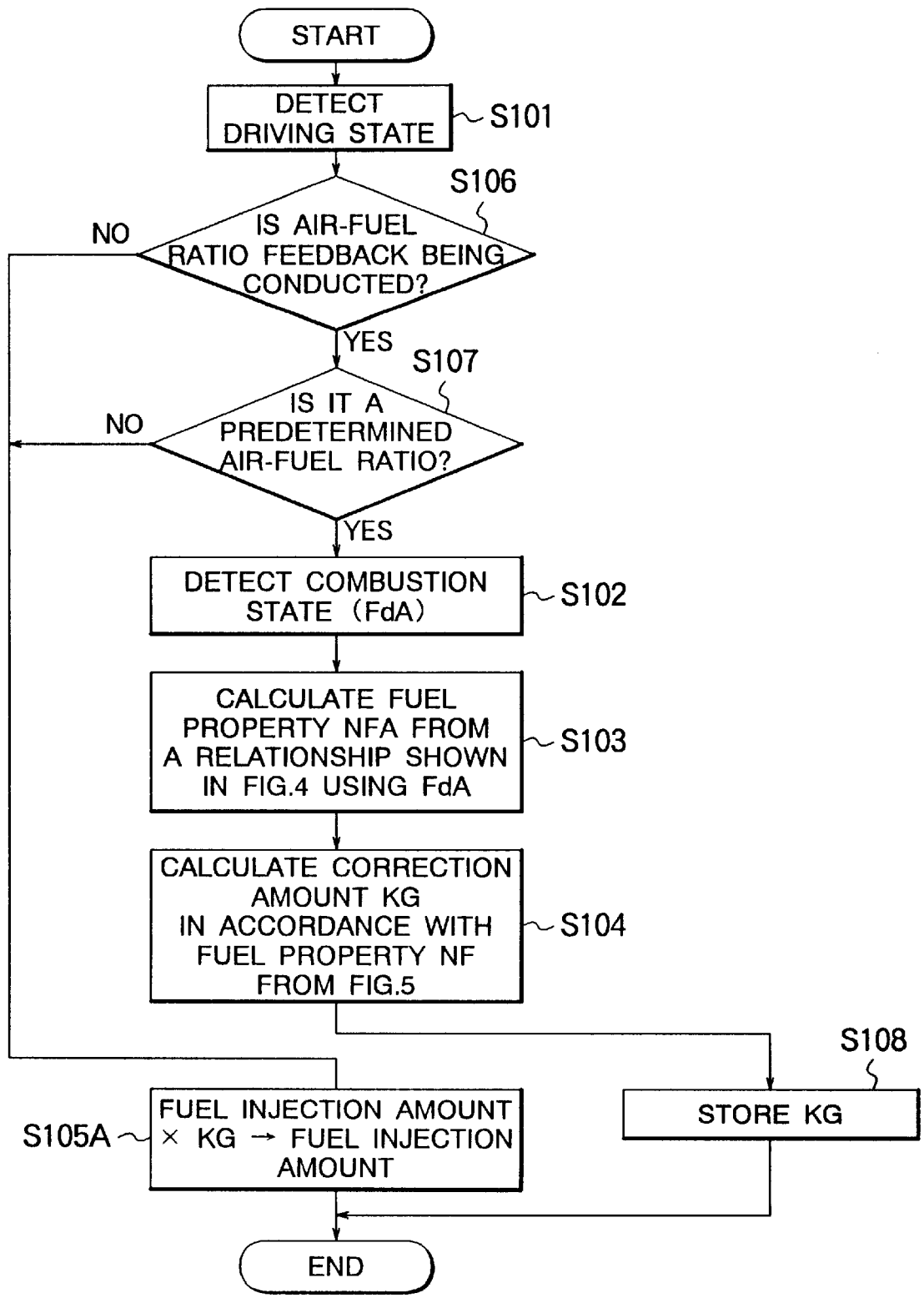
FIG. 10 is a flowchart showing a fuel injection amount correcting operation according to a fifth embodiment of the invention.

FIG. 10 is a flowchart showing the fuel injection amount correcting operation according to the fifth embodiment of the present invention. The fifth embodiment differs from the above-described embodiment (see FIG. 8) in that the procedure is advanced to the fuel injection correcting step (step S105) when the air-fuel ratio feedback is not being conducted, and that step S108 for storing a correction coefficient KG is added.

In this case, the correction coefficient KG calculated in step S104 during the air-fuel feedback is stored in a RAM in the ECU 12A in step S108.

On the other hand, when it is determined "No" in step S106 or 107 (when the air-fuel feedback control is not being conducted), the procedure is advanced to step S105, and the fuel injection amount is corrected based on the stored correction coefficient KG.

By limiting the fuel injection amount correction (step S105) by the fuel property NF only to the driving state in which the air-fuel feedback control is not being conducted (an influence of the fuel property NF is greater) in this manner, it is possible to prevent the fuel injection amount correction in accordance with the fuel property NF from being deviated from undesirable value.

Sixth Embodiment

Although the above first to fifth embodiments have been described based on a case in which the fuel injection amount is corrected in accordance with the fuel property NF, other control parameter, e.g., an igniting timing may be corrected.

In this case, the control calculating means 34 (see FIG. 2) includes an igniting timing correcting means for correcting the igniting timing in accordance with the fuel property NF, and the parameter correcting means 36 outputs a correction signal CK which corresponds to an igniting timing correction amount in accordance with the fuel property NF.

Figure 11:
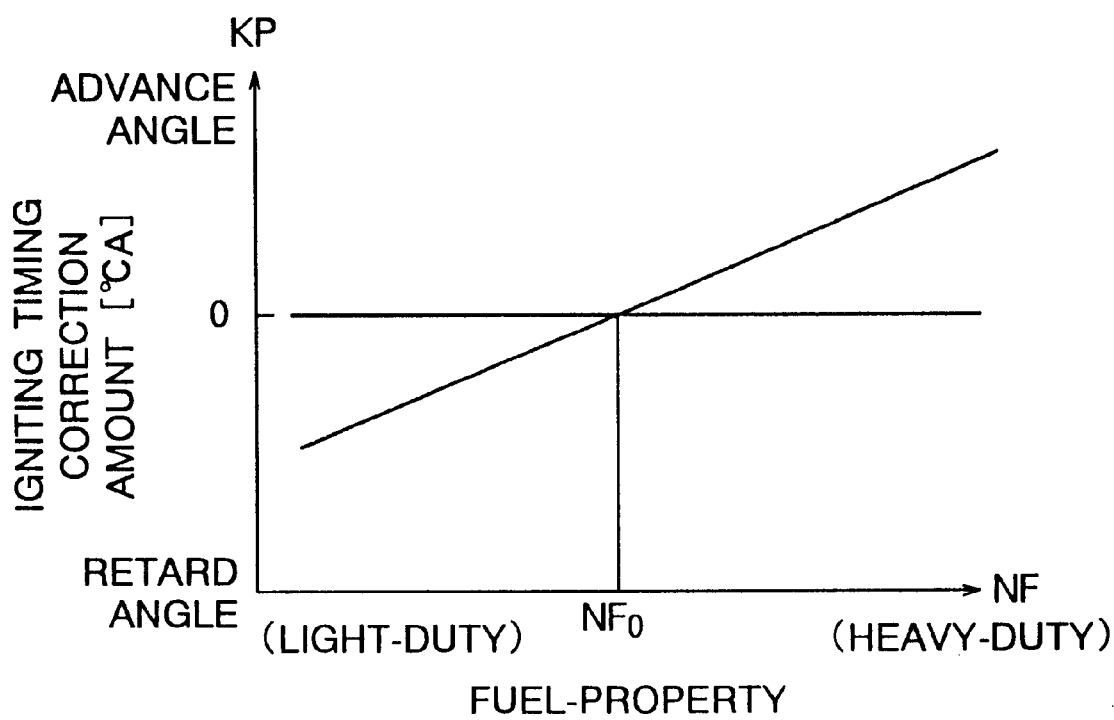
FIG. 11 is a view for explaining an igniting timing correcting operation according to a sixth embodiment of the invention.

FIG. 11 is a view for explaining an igniting timing correction amount KP calculated in accordance with the fuel property NF according to the sixth embodiment of the present invention. The igniting timing correction amount is increased as an amount of the heavy-duty components which burn slower is increased.

Figure 12:
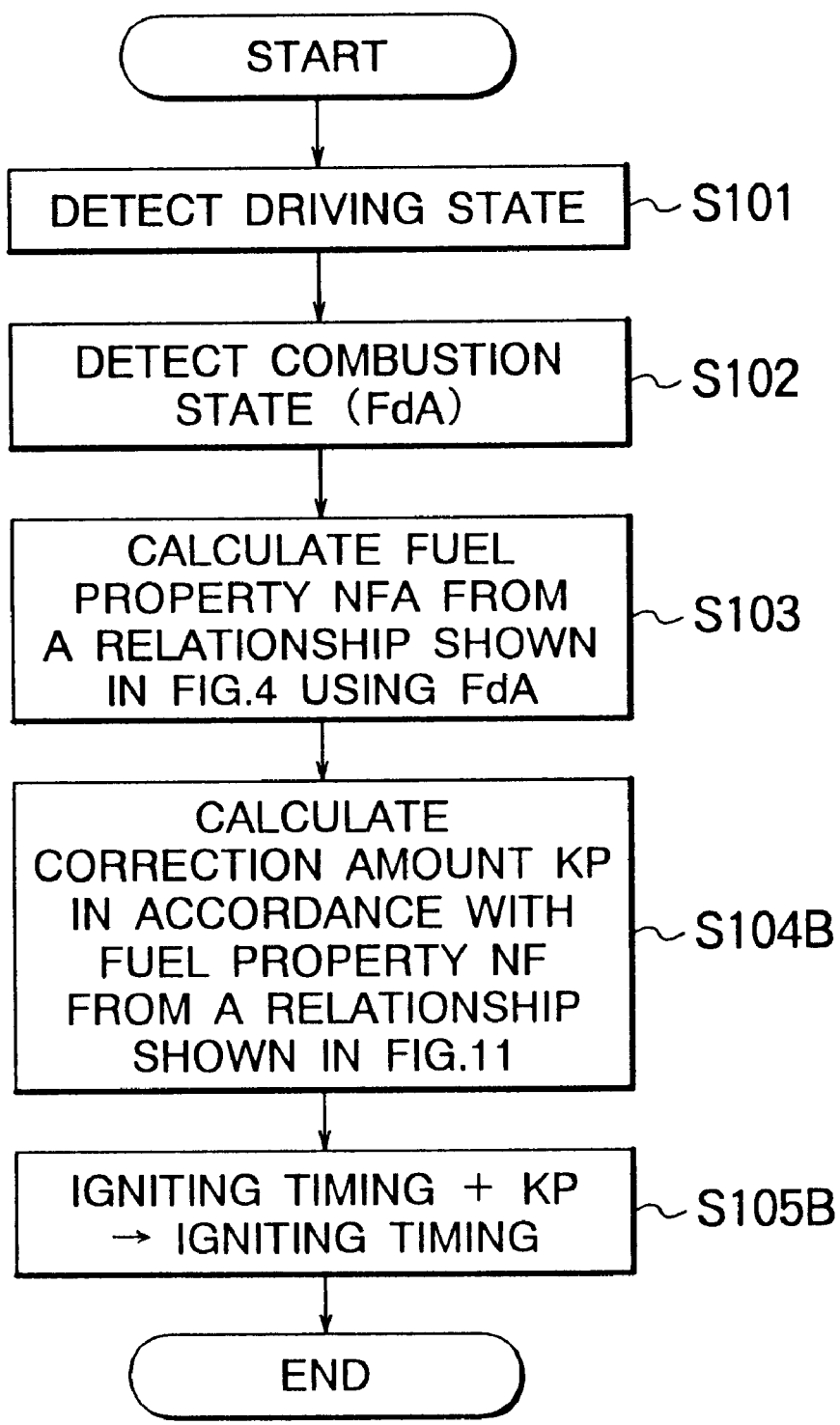
FIG. 12 is a flowchart showing the igniting timing correcting operation according to the sixth embodiment of the invention.

FIG. 12 is a flowchart showing the igniting timing correcting operation according to the sixth embodiment of the invention, and steps S101 to S103 are the same as those described above.

In FIG. 12, the parameter correcting means 36 (see FIG. 2) calculated the igniting timing correction amount (correction coefficient) KP in accordance with the fuel property NF based on a relation shown in FIG. 11, using the fuel property NF calculated in step S103, and outputs the correction signal CK which corresponds to the igniting timing correction amount KP (step S104B).

Subsequently, the igniting timing correcting means in the control calculating means 34 adds the igniting timing correction amount KP to an initial igniting timing calculated in accordance with the driving state DR, and calculates a final igniting timing in accordance with the fuel property NF (step S105B).

More specifically, when the fuel property is lighter than than the standard fuel property NFo, the igniting timing is corrected toward a retard angle side (KP<0), and when the fuel property NF is heavier than the standard fuel property NFo, the igniting timing is corrected toward an advance angle side (KP>0).

By correcting the igniting timing in accordance with the calculated fuel property NF, the igniting timing correction amount in accordance with the driving state DR is further corrected properly and therefore, it is possible to prevent a deterioration of the exhaust gas due to a fuel property at the time of acceleration or deceleration, and the deterioration of the drivability.

Seventh Embodiment

Although the driving condition when the fuel property is calculated is not set in the above sixth embodiment, the driving condition during the air-fuel ratio feedback control may be set as a calculating condition of the fuel property NF as in the third embodiment.

In this case, the igniting timing correcting means in the control calculating means 34 corrects the igniting timing in accordance with the fuel property NF calculated during the feedback control.

Figure 13:
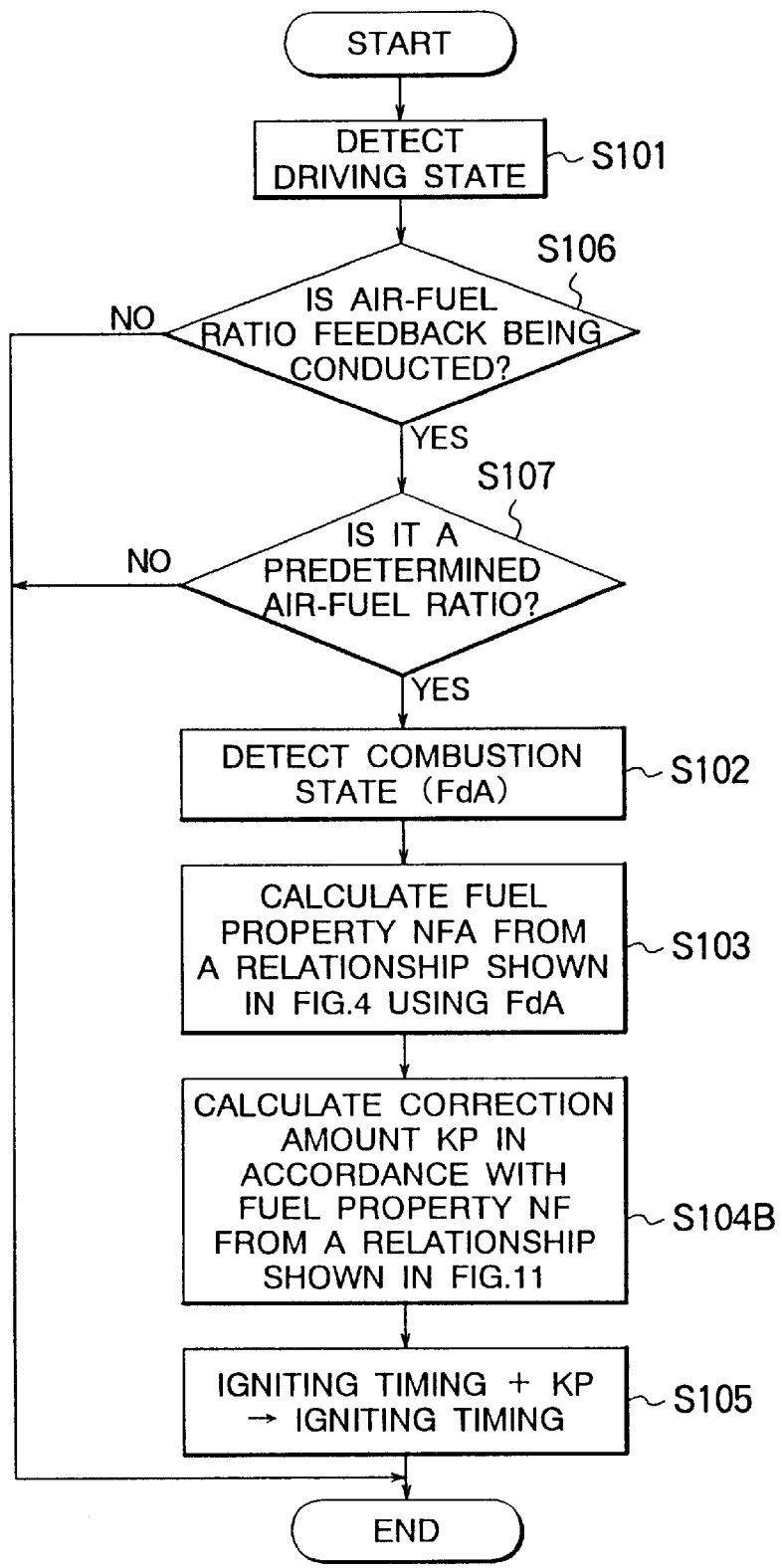
FIG. 13 is a flowchart showing the igniting timing correcting operation according to a seventh embodiment of the invention.

FIG. 13 is a flowchart showing the fuel property calculating operation and the igniting timing correcting operation according to the seventh embodiment of the present invention.

In FIG. 13, steps S101 to S103, S106 and S107 are the same as those shown in FIG. 8, and the igniting timing correction amount calculating step S104B and the igniting timing correcting step S104B are the same as that shown in FIG. 12.

Only when it is determined that the fuel feedback is being conducted in steps S106 and S107 (i.e., Yes), the fuel property NF is detected from the driving state DR and the combustion state Fd (step S103), and the igniting timing is corrected (step S105B) using the igniting timing correction amount KP (step S104B) in accordance with the fuel property NF.

With this procedure, the igniting timing correction amount KP is further corrected properly based on the precisely calculated fuel property NF and therefore, it is possible to more effectively prevent a deterioration of the exhaust gas due to a fuel property at the time of acceleration or deceleration, and the deterioration of the drivability.

Eighth Embodiment

Although only the igniting timing is corrected in the above-described seventh embodiment, both the fuel injection amount and the igniting timing may be corrected in accordance with the fuel property detected during the air-fuel ratio feedback.

In this case, the control calculating means 34 includes means for correcting both the fuel injection amount and the igniting timing in accordance with the fuel property NF.

Figure 14:
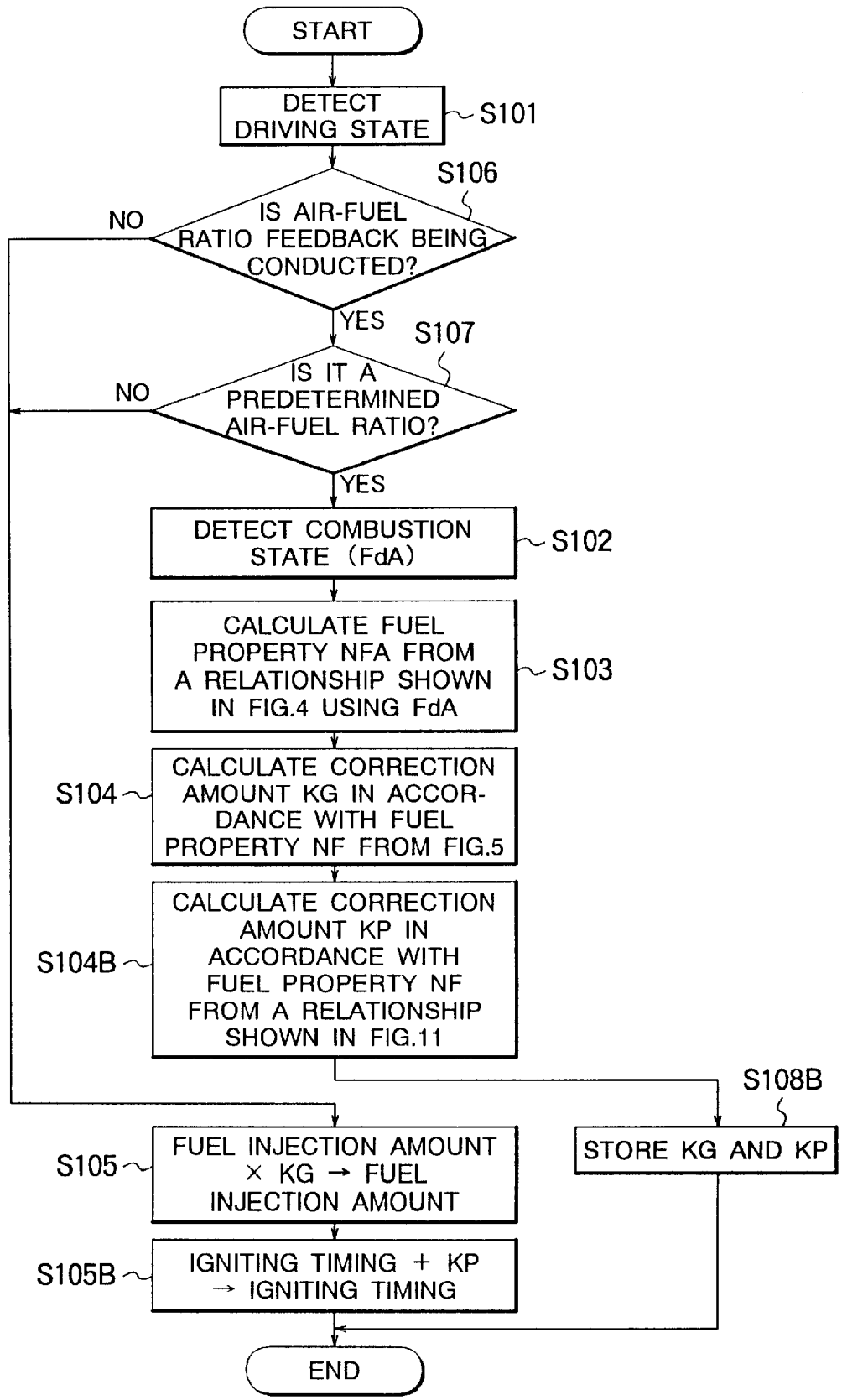
FIG. 14 is a flowchart showing a fuel injection amount correcting operation according to an eighth embodiment of the invention.

FIG. 14 is a flowchart showing the correcting operation for the fuel injection amount and the igniting timing according to the eighth embodiment of the present invention. Steps S101 to S107, S104B and S105B are the same as those described above.

In FIG. 14, the fuel property NF is first calculated during the air-fuel ratio feedback (step S103), each of the correction coefficients KG and KP is calculated in accordance with the fuel property NF (steps S104 and S104B), and the calculated correction coefficients KG and KP are stored (step S108B).

On the other hand, in a driving state except during the air-fuel ratio feedback, both the fuel injection amount and the igniting timing are corrected using the correction coefficients KG and KP which are calculated based on the fuel property NF (steps S105 and S105B).

With this procedure, as compared with a case in which only the fuel injection amount or the igniting timing is corrected, it is possible to more effectively prevent a deterioration of the exhaust gas due to a fuel property at the time of acceleration or deceleration, and the deterioration of the drivability.

Ninth Embodiment

Although each of the correction coefficients KG and KP for the fuel injection amount and the igniting timing is stored in step S108B in the eighth embodiment, the fuel property NF calculated in step S103 may be stored in the RAM in the ECU 12A.

In this case, the control section 30 in the ECU 12A includes fuel property storing means MG for storing the fuel property NF.

Figure 15:
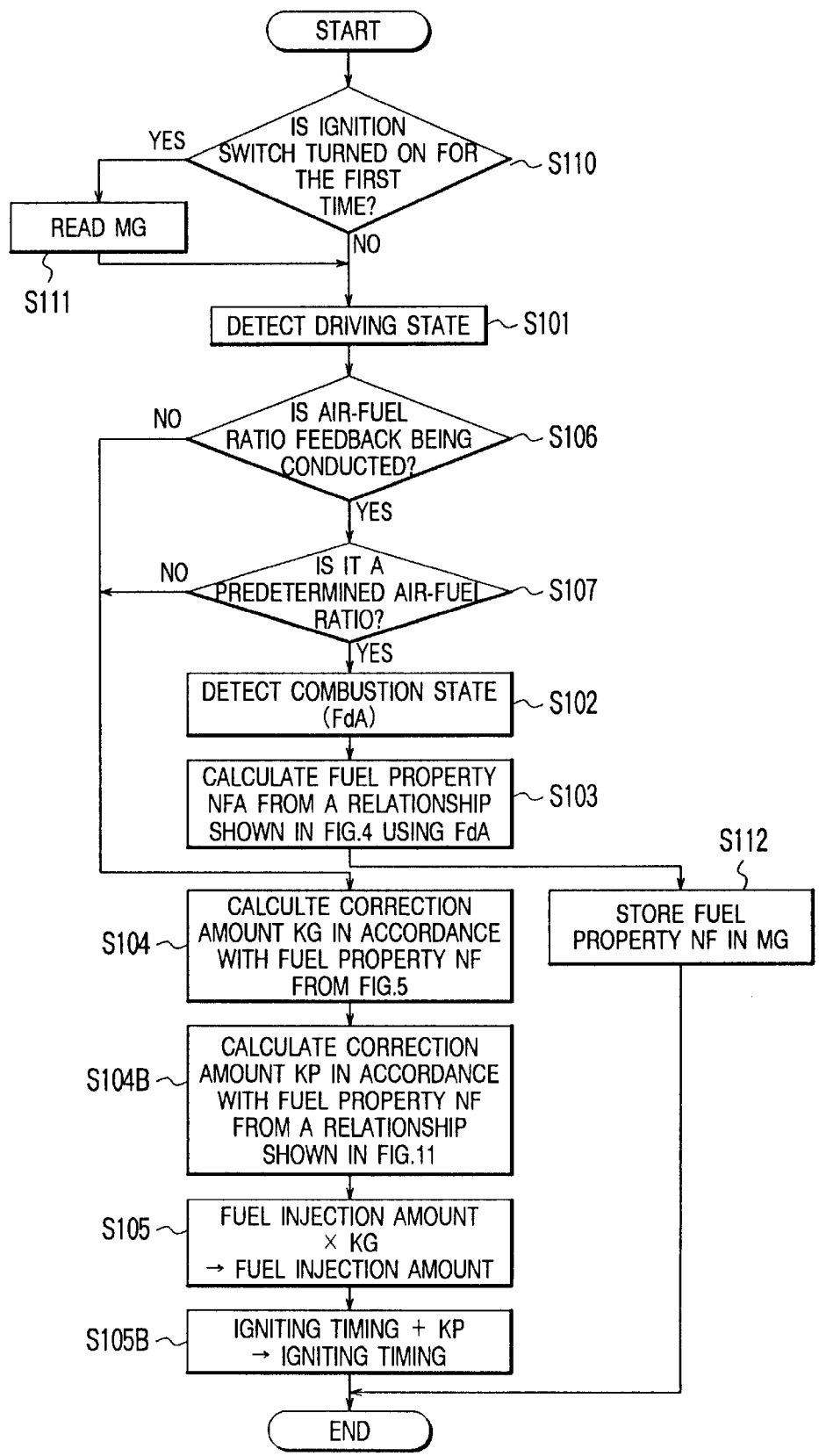
FIG. 15 is a flowchart showing a correcting operation of the fuel injection amount and the igniting timing.

FIG. 15 is a flowchart showing the correcting operation of the fuel injection and the igniting timing. Steps S101 to S107, S104B and S105B are the same as those described above.

In FIG. 15, it is determined whether or not the ignition switch was turned ON for the first time (step S110), and if the ignition switch was turned ON for the first time (i.e., Yes), the fuel property NF is read from the fuel property storing means MG (step S111), and the procedure is advanced to a driving state detecting process (step S101). On the other hand, if it is determined that the ignition switch was not turned on for the first time (i.e., No), the procedure is advanced directly to step S101.

Thereafter, as in the previous embodiment, the fuel state amount Fd is detected during the air-fuel ratio feedback (step S102), and the fuel property NF is calculated (step S103).

Subsequently, the fuel property NF calculated in step S103 is stored in the fuel property storing means MG (step S112), and the procedure is returned.

On the other hand, in a driving state except when the air-fuel ratio feedback is not being conducted, each of the correction coefficients KG and KP for the fuel injection amount and the igniting timing is calculated (steps S104 and S104B), and each of them is calculated for correction (steps S105 and S105B).

By previously storing the fuel property NF calculated during the air-fuel feedback in this manner, it is possible to calculate the engine control parameters for correction in accordance with the fuel property NF faster as compared with the previous embodiments.

Further, because time and region in which the correction (steps S105 and S105B) in accordance with the fuel property NF can be conducted are increased, it is possible to prevent the deterioration of the exhaust gas due to the fuel property NF and the deterioration of the drivability.

Tenth Embodiment

Although specific processing operations for the ionic current processing section 29 in the combustion state detecting means 25 and the combustion variation processing section 31 (see FIG. 1) in the control section 30 were not particularly described in the first to ninth embodiments, a main combustion integrating value may be used as an ionic current component (combustion state amount Fd) for determining the combustion state, and a standard deviation after statistical processing may be used as a variation amount ΔFd.

As described above, the combustion state detecting means 25 includes the ionic current detecting means for flowing the ionic current I through at least one of cylinders of the engine 1 to detect the ionic current signal Ed, and the ionic current processing section 29 for calculating the combustion state amount (a value showing the combustion state) Fd.

Further, the ionic current processing section 29 inputs the ionic current i over a predetermined interval, and includes ionic current component detecting means for detecting an ionic current component which corresponds to a combustion level in a cylinder. The ionic current processing section 29 calculates the combustion state amount Fd from the ionic current component.

The control section 30 includes a combustion variation processing section 31 for calculating the variation amount (a variation state of combustion) ΔFd from the combustion state amount Fd which is output for every combustion of each of the cylinders.

Figure 16:
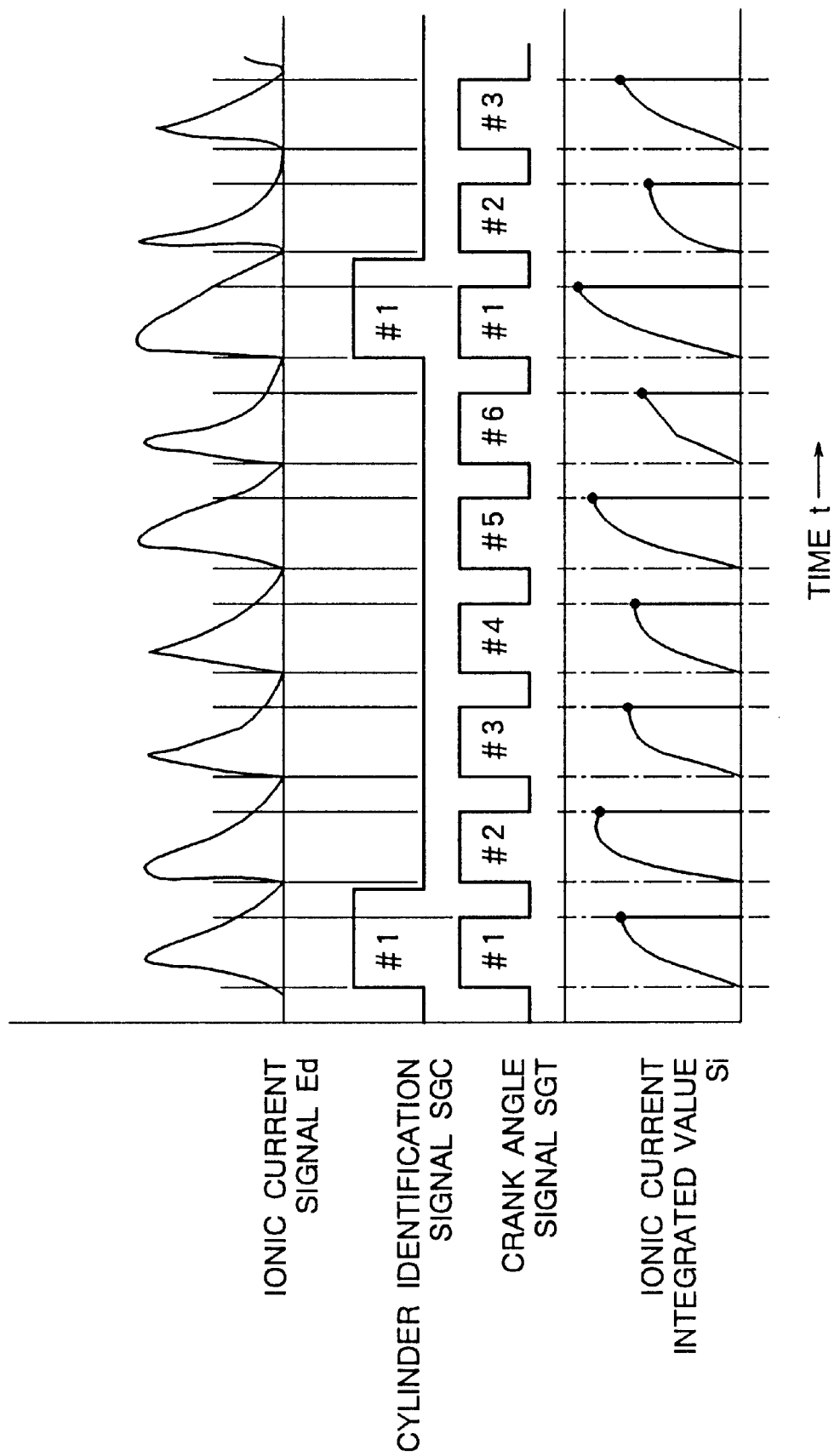
FIG. 16 isa wave form chart showing the operation of ionic current processing section according to a tenth embodiment of the invention.

FIG. 16 is a wave form chart showing the operation of the ionic current processing section 29 according to the tenth embodiment of the present invention.

In FIG. 16, a cylinder identification signal SGC includes a pulse which corresponds only to a specific cylinder (e.g., #1), and the crank angle signal SGT includes a pulse having an edge which corresponds to a reference position of each of the cylinders (#1 to #6), as in a prior art.

The engine 1 as indicated here includes six cylinders. The ionic current detecting means in the combustion state detecting means 25 detects the ionic currents i of all of the cylinders (#1 to #6), and obtains a wave form of the ionic current signal Ed which is provided by voltage-converting an output value of the ionic current i in a combustion cycle of each of the cylinders.

The ionic current processing section 29 integrates the ionic current signal Ed during a main combustion period of each of the cylinder determined between pulse edges (reference crank angle) of the crank angle signal SGT, and outputs a main combustion integrated value (ionic current integrated value) Si of the ionic current signal Ed as the combustion state amount (ionic current component) Fd.

More specifically, the ionic current i is integrated based on the reference crank angle of the crank angle signal SGT, and the integrated result is determined as the ionic current integrated value Si.

An interval for integration in this case is set from a rising-up edge to a falling-down edge of each pulse of the crank angle signal SGT.

Therefore, the ionic current integrated value Si indicates a value which is integrated over the main combustion interval during which the ionic current i detected at the time of combustion of each of the cylinders is constant, i.e., indicates a processing result which meets the output of the engine 1 or a pressure in the cylinder. Therefore, such value can be used as the combustion state amount Fd.

Subsequently, the combustion variation processing section 31 statistically processes the ionic current integrated value Si of a predetermined number of cycles to obtain statistical data value of each of the ionic current integrated values Si, i.e., average value, minimum value, maximum value and standard deviation, and outputs, e.g., the standard deviation as the variation amount ΔFd.

Figure 17:
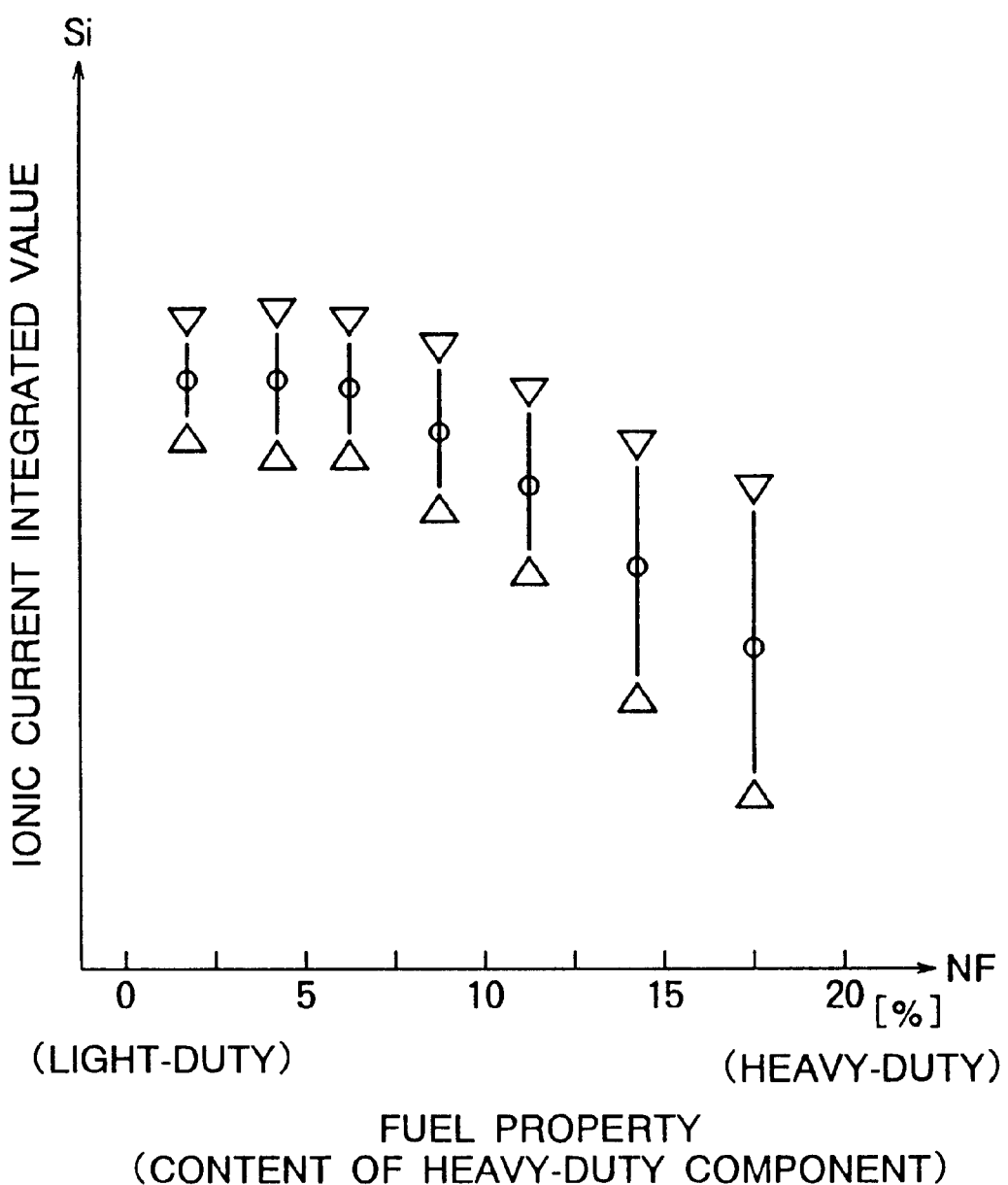
FIG. 17 is a view for explaining the operation of fuel property calculating means according to the tenth embodiment of the invention.

FIG. 17 is a view for explaining a relationship between the fuel property NF and the statistical data value obtained by the combustion variation processing section 31. Although FIG. 17 only shows the ionic current integrated value Si of the first cylinder as a representative, it is needless to say that other cylinders show substantially similar tendencies.

In FIG. 17, the axis of abscissae is for the fuel property NF indicated with content (%) of heavy-duty component, and the axis of ordinates is for the statistical data value of the ionic current integrated value Si calculated during a predetermined cycle. Marks ○, Δ and Δ indicate the average value, the minimum value and the maximum value, respectively. The standard deviation of each of the data values is indicated by a solid line which is extended in a vertical direction from the average value marked with ○.

For example, in a case of a light-duty fuel having an excellent burning property, ionic current integrated value Si for every cycle is high as a whole and the standard deviation is small. In a case of a heavy-duty fuel having an inferior burning property, ionic current integrated value Si for every cycle is low as a whole and the standard deviation is large.

In generally, if the fuel property NF (heavy-duty component) (%) is increased in one cylinder, an average value (marked with ○) of ionic current integrated value indicative of a combustion state is decreased as the ionic current integrated value Si (combustion state amount) is varied.

It has been found out that a standard deviation also varies in accordance with the fuel property NF in a similar manner. This is because if the fuel property NF is varied, a burning state becomes unstable and thus, the ionic current integrated value Si (combustion state amount) is varied and a standard deviation is increased.

Here, the average value (marked with ○) is varied depending upon a state of the ignition plug 23, a operational region of the engine 1 and the like, it is effective to use, as the variation amount ΔFd, a standard deviation or a valuation function associated with the variation.

By detecting, as a combustion state amount Fd, the integrated value Si of the ionic current i which is generated at the time of combustion as described above, it is possible to detect a combustion state amount Fd of each of the cylinders for every combustion cycle.

Further, the combustion variation processing section 31 statistically processes ionic current integrated values Si in the current cycle and the last cycle before the current cycle calculated by the combustion state detecting means 25, and calculates its standard deviation as a variation amount ΔFd. Therefore, it is possible to precisely obtain a variation amount ΔFd indicative of combustion state of each of the cylinders, and reliably calculate the fuel property NF.

That is, because the combustion state amount Fd is detected from the ionic current i, a combustion state of each of the cylinders can be detected for every combustion cycle. Further, a detected data value for every cycle is statistically processed under a predetermined condition. Therefore, even if a combustion state amount having a large variation for every combustion cycle is used, it is possible to suppress data from being deviated, and to accurately obtain a combustion state to provide a fuel property NF accurately.

In this case also, if a combustion state amount Fd detected when the air-fuel ratio feedback control is being conducted is used, it is possible to detect a fuel property NF more precisely to enhance the reliability of correction of acceleration or deceleration.

Eleventh Embodiment

Although the ionic current integrated value Si is used as the combustion state amount Fd in the above-described tenth embodiment, a main combustion period of an ionic current may be used.

Figure 18:
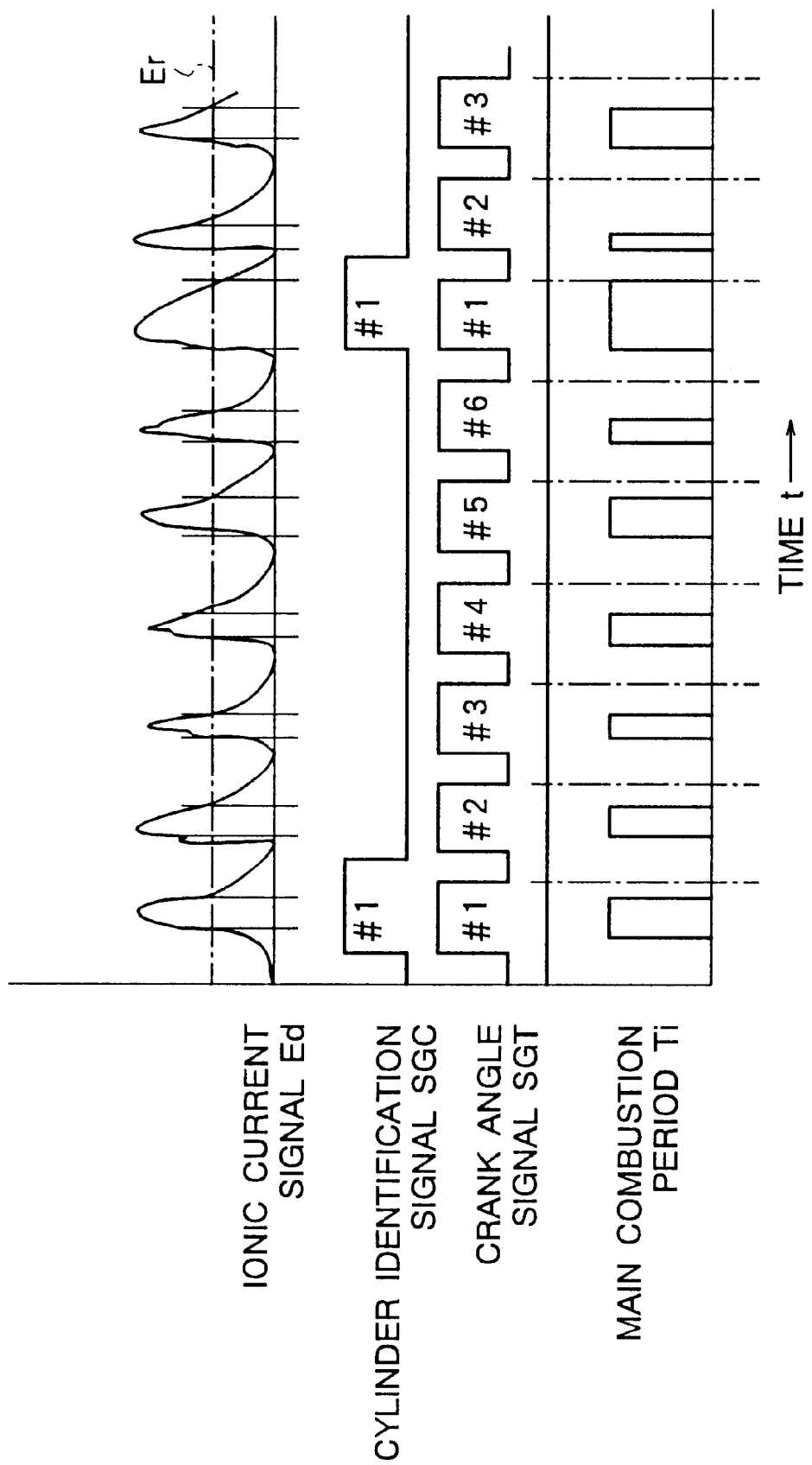
FIG. 18 is a wave form chart showing the operation of the ionic current processing section according to an eleventh embodiment of the invention.

FIG. 18 is a wave form chart for explaining the operation of the ionic current processing section 29 according to the eleventh embodiment of the invention.

In this case, the ionic current processing section 29 forms, into a pulse wave form, a time period during which a voltage value of the ionic current signal Ed exceeds the reference set value Er, and outputs ON time of this pulse (main combustion period) Ti as the combustion state amount Fd.

With this procedure, it is possible to easily obtain the main combustion period Ti in accordance with a fuel property in each of the cylinders.

That is, the main combustion period Ti corresponding to the output of the engine 1 can be measured only by using a simple time counter for measuring a pulse length indicative of Ed>Er.

Further, as in the previous embodiment, the combustion variation processing section 31 statistically processes the main combustion period Ti of predetermined number of cycles to provide statistical data of the main combustion period Ti (average value, minimum value, maximum value and standard deviation), and outputs the standard deviation as a variation amount ΔFd, for example.

When the standard deviation is used as a variation amount ΔFd, a variation amount ΔFd in a combustion cycle from the last time combustion cycle (n-m-th cycle) to the current time cycle (n-th cycle) is expressed according to the following equation (2)

$$\Delta Fd(n) = \sqrt{[\{m \cdot \Sigma(Fd(k))^2 - (\Sigma Fd(k))^2\}/m^2]} \quad (2)$$

wherein in the equation (2), ΔFd(n) indicates a variation amount of a combustion state of n-th combustion cycle, Fd(k) indicates a combustion amount of k-th (k≦n) combustion cycle, and m indicate the number of data used for calculating the standard deviation. The number of data m may be changed depending upon a driving state and a degree of variation of data.

A range of calculation of each of the sum total terms Σ is from k=n−(m−1) to k=n.

Figure 19:
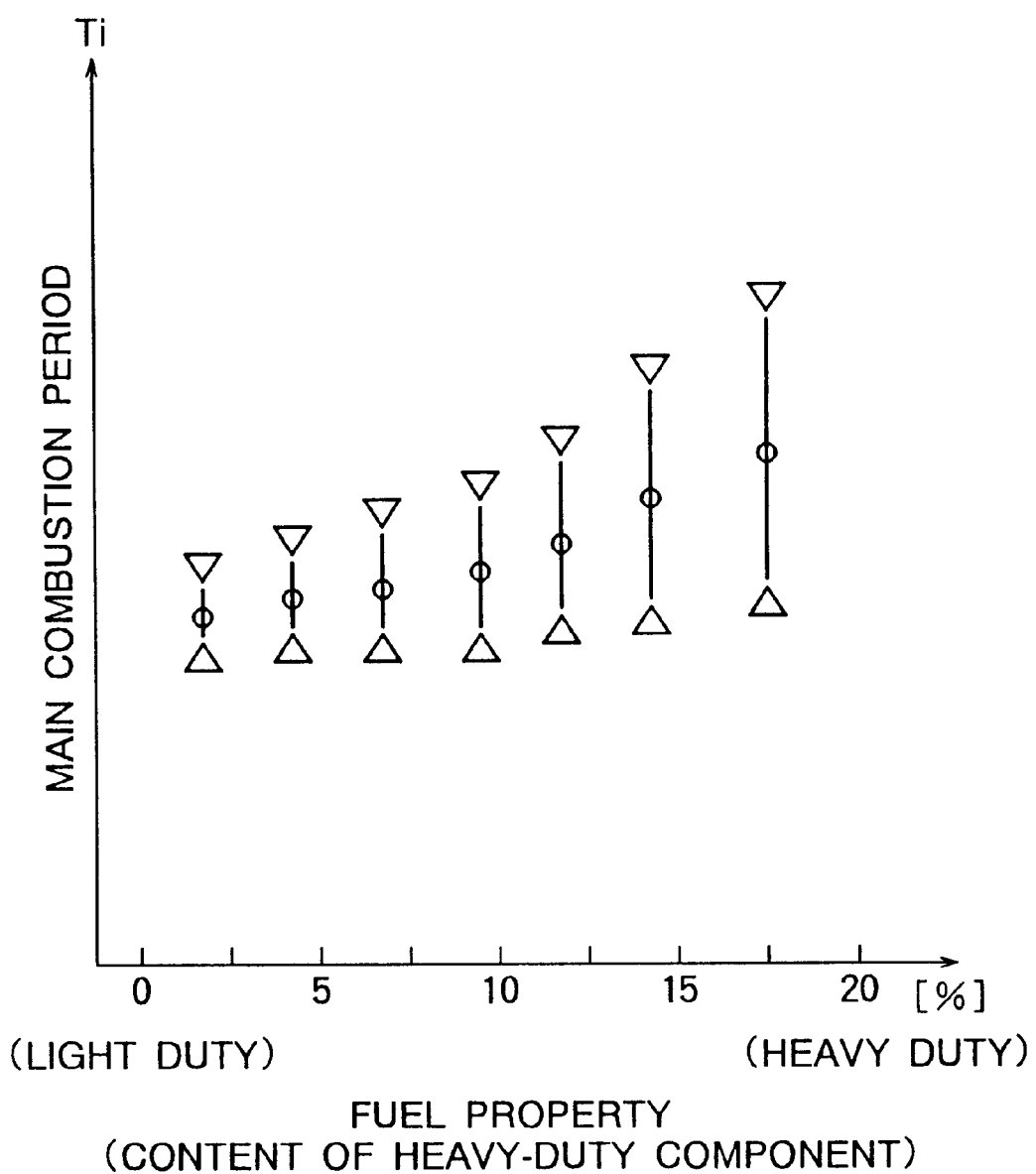
FIG. 19 is a view for explaining the fuel property calculating means according to the eleventh embodiment of the invention.

FIG. 19 is a view for explaining a relationship between a fuel property NF and statistical data value obtained by the combustion variation processing section 31.

In FIG. 19, the axis of abscissae is for the fuel property NF (content of heavy-duty component), and the axis of ordinates is for the statistical data value of the main combustion period Ti calculated between predetermined cycles. Each of the statistical data values is the same as that described above.

As shown in FIG. 19, when a main combustion period Ti of an ionic currnt i is used as a combustion state amount Fd, the combustion speed becomes slower as the heavy-duty component is increased (the main combustion period is increased) and therefore, the average value of the main combustion periods Ti is increased. As the heavy-duty component is increased, the combustion state becomes unstable and therefore, the standard deviation is increased.

Therefore, by using the standard deviation of the main combustion period Ti for every combustion cycle as a deviation amount ΔFd, it is possible to reliably calculate a fuel property NF based on the standard deviation (variation amount ΔFd) indicative of statistical data of a combustion state amount Fd of each of the cylinders detected for every combustion cycle.

Although a standard deviation of #1 cylinder is used as a deviation amount ΔFd in the above-mentioned equation (2), a standard deviation of another cylinder or an average value of a plurality of standard deviation data of a plurality of cylinders may be used.

Further, an average value of combustion state amounts of a predetermined number of cycles.

Twelfth Embodiment

Although a standard deviation or an average value is used as a variation amount ΔFd in the previous tenth and eleventh embodiments, a ratio (variation ratio) of a difference absolute value of the combustion state amounts Fd between the last time cycle and the current time cycle to an average value of the combustion state amounts Fd may be used as the variation amount ΔFd.

In this case, the combustion variation processing section 31 calculates a difference absolute value |ΔF(n)|(=|Fd(n)−Fd(n−1)|) between the current time combustion state amount Fd(n) calculated during the current time cycle and the last time combustion state amount Fd(n−1) calculated during the last time cycle (n−1).

Further, the combustion variation processing section 31 calculates an average value MF(n)(={Fd(n)+Fd(n+1)}/(2·Δt)) between the current time combustion state amount Fd(n) and the last time combustion state amount Fd(n−1), and calculates, as a variation amount ΔFd of a combustion state amount Fd, a ratio, i.e., a variation ratio (=|ΔF(n)|MF(n)) of the difference absolute value |ΔF(n)| to the average value MF(n) according to the following equation (3):

$$\Delta Fd(n) = |Fd(n) - Fd(n-1)|/[\{Fd(n) + Fd(n-1)\}/(2 \cdot \Delta t)] \quad (3)$$

wherein in the equation (3), Fd(n) indicates a combustion state amount during the current time combustion cycle, Fd(n−1) indicates a combustion state amount during the last time combustion cycle, and Δt indicates a data sampling time corresponding to an interval of each of the combustion cycles.

A calculation of a variation amount ΔF is completed in a time period as short as two times of the data sampling time Δt by using the equation (3) and therefore, the variation amount ΔF of the combustion state amount Fd can be calculated substantially in real time.

Thirteenth Embodiment

Although the current time combustion state amount Fd(n) and the last time combustion state amount Fd(n−1) are used in the twelfth embodiment, values of the predetermined arbitrary number of cycles m may be integrated.

In this case, the combustion variation processing section 31 calculates a variation amount ΔFd(n) of a combustion state amount Fd by integrating, a value calculated using the equation (3), by the predetermined number of cycles m, according to the following equation (4):

$$I\Delta Fd(n) = \Sigma\{\Delta Fd(k)\} \quad (4)$$

wherein a range of calculation of the sum total term Σ is from k=n−(m−1) to k=n, and m is the number of times of integration (the number of predetermined cycles).

Figure 20:
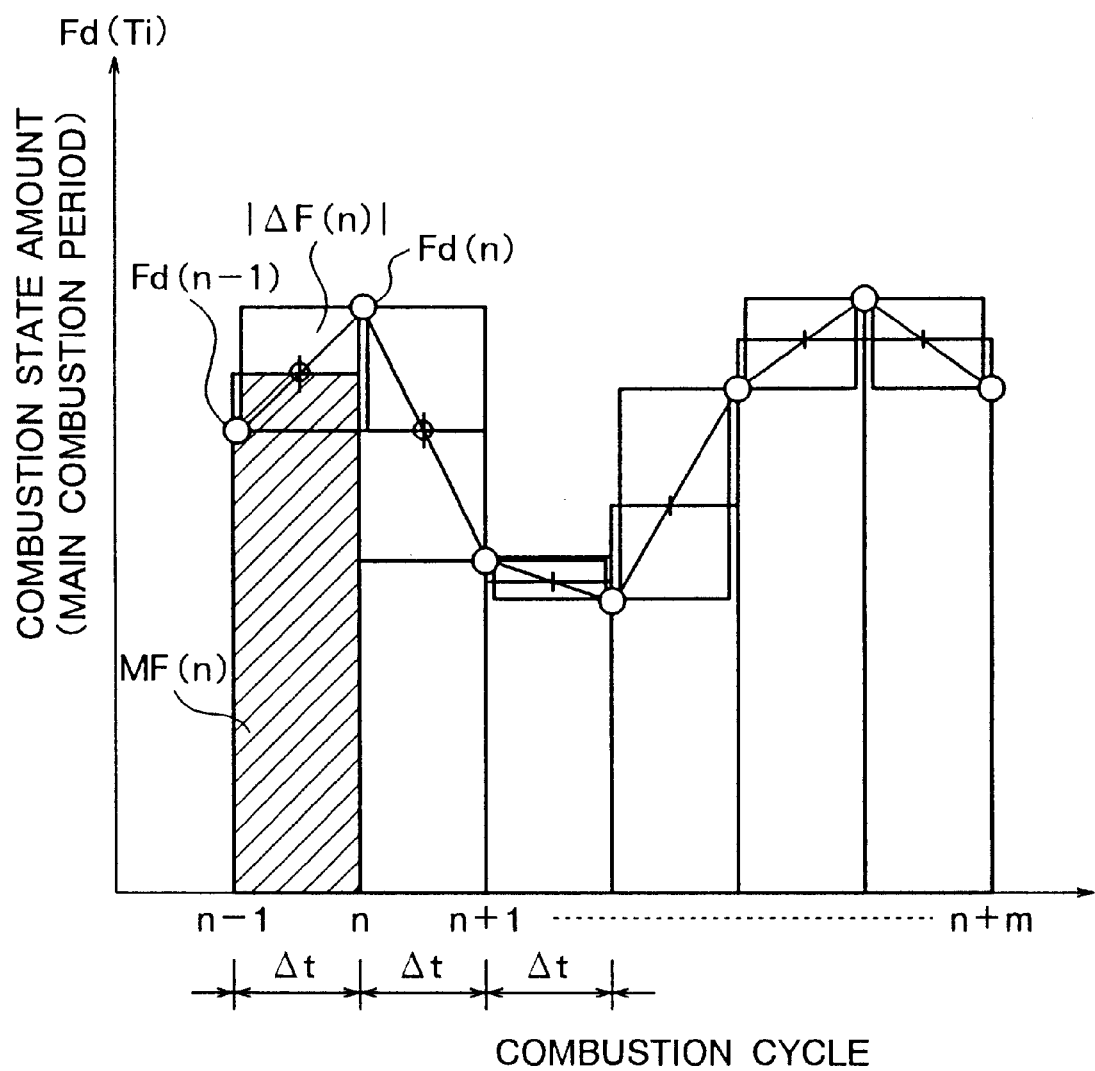
FIG. 20 is a view for explaining the operation of a combustion variation processing section according to a thirteenth embodiment of the invention.

FIG. 20 is a view for explaining the operation of the combustion variation processing section 31 according to the thirteenth embodiment of the invention.

In FIG. 20, the axis of abscissae is for combustion cycles (n−1, n, n+1, . . . , n+m), and the axis of ordinates is for combustion state amount Fd, i.e., various data values of a main combustion period Ti (combustion state amount, difference absolute value and average value).

Although there is described a case in which the main combustion period Ti of the ionic current I is used as the combustion state amount Fd (see FIG. 18), the ionic current integrated value Si (see FIG. 16) may be used.

Further, although only the processing data for a single cylinder is shown, it is needless to say that the same calculations are conducted for other cylinders.

In FIG. 20, the magnitude of a difference absolute value |ΔF(n)| between a combustion state amount Fd(n) of, e.g., n-th combustion cycle and a combustion state amount Fd(n−1) of one-time-prior combustion cycle (n−1) is indicated by a frame portion, and the magnitude of an average value MF(n) is indicated by the shaded portion.

A variation value ΔFd(n) during the n-th combustion cycle is indicated with a ratio (variation ratio) of a difference absolute value |ΔF(n)| to an average value MF(n).

By adding this variation ratio repeatedly for the number of combustion cycles over m times (five times in FIG. 20), the integrated value IΔFd(n) shown in the equation (4) can be obtained.

By using an integrated value ΔFd(n) as a variation amount ΔFd of a combustion state in this manner, a reliability of a calculated result of a variation amount ΔFd is enhanced, although a calculating time is increased as compared with the twelfth embodiment.

Therefore, it is possible, as a result, to accurately calculate a fuel property NF, and to correct control parameters in accordance with the fuel property NF in the most suitable manner.

Although the number m of times of integration is indicated as five times in FIG. 20, it is needless to say that such number of times may be changed depending upon a required accuracy, a driving state and the like.

Further, although the integrated value IΔFd(n) of the variation amount for a single cylinder is calculated in the thirteenth embodiment, an integrated value of an arbitrary cylinder as a representative, or an average value of integrated values of a plurality of cylinders may be used as in the previous embodiment.

Fourteenth Embodiment

Although the above-described twelfth and thirteenth embodiments use a variation ratio which is a ratio of a difference absolute value to an average value, it is possible to use a deviation between the current time combustion state amount Fd(n) and a moving average value MS(n) of the predetermined number of previous cycles.

Figure 21:
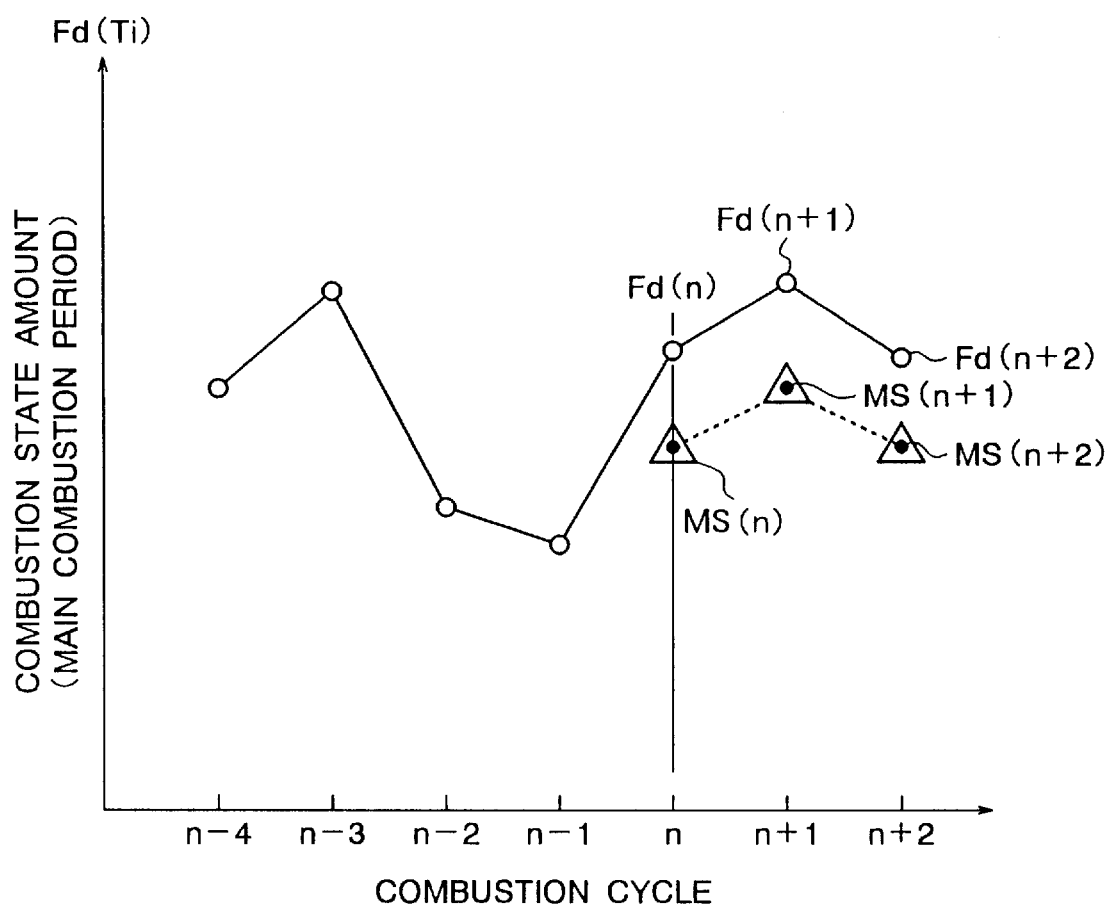
FIG. 21 is a view for explaining the operation of a combustion variation processing section according to a fourteenth embodiment of the invention.

FIG. 21 is a view for explaining the operation of the combustion variation processing section 31 according to the fourteenth embodiment of the invention.

In FIG. 21, the axis of abscissae is for combustion cycles (n−4, n−3, ..., n, n+1, ...), and the axis of ordinates is for each of combustion state amounts Fd (main combustion period Ti) and a moving average value MS of combustion state amounts of the predetermined number of previous cycles.

A combustion state amount Fd is not limited to a main combustion period Ti and may be an ionic current integrated value Si, and similar data processings are conducted also for other cylinders.

In this case, the combustion variation processing section 31 calculates, as a variation amount ΔFd(n), an absolute value of a deviation between a combustion state amount Fd(n) during the current time cycle and a moving average value MS(n) (=ΣFd/m) of combustion state amounts during the predetermined number of previous cycles, among combustion state amounts Fd calculated by the combustion state detecting means 25, according to the following equation (5):

$$\Delta Fd(n) = |Fd(n) - \Sigma\{Fd(k)/m\}| \tag{5}$$

wherein in the equation (5), m indicates the number of moving averages (e.g., m=5) of data which are previously set, and a range of calculation of the sum total term Σ is from k=n−(m−1) to k=n.

According to the equation (5), a variation amount ΔFd(n) of a combustion state is indicated with an absolute value of a deviation between a combustion state amount Fd(n) of during a corresponding cycle and a moving average value MS(n) of combustion state amounts during the predetermined number of cycles.

By calculating a fuel property NF from a deviation between the current time combustion state amount Fd(n) and a moving average value MS(n) in this manner, it is possible to obtain the same effect as that described above.

Although data values for a single cylinder are indicated in FIG. 21, data values for another cylinder as a representative, or an average value of a plurality of cylinders may be used.

What is claimed is:

1. A control apparatus for an internal combustion engine, comprising:

driving state detecting means for detecting a driving state of said internal combustion engine based on detected information from various sensors;

control calculating means for calculating a control parameter of said internal combustion engine in accordance with said driving state;

combustion state detecting means for detecting a combustion state amount of at least one of cylinders of said internal combustion engine;

fuel property calculating means for calculating a property of a fuel supplied to said internal combustion engine based on said driving state and said combustion state amount; and parameter correcting means for correcting said control parameter in accordance with said fuel property.

2. A control apparatus for an internal combustion engine according to claim 1, wherein said control parameter includes a fuel injection amount supplied to each of said cylinders of said internal combustion engine.

3. A control apparatus for an internal combustion engine according to claim 2, wherein said driving state detecting means detects a transition state which corresponds to an acceleration/deceleration driving state of said internal combustion engine, said control calculating means increases or decreases said fuel injection amount in accordance with said transition state, and said parameter correcting means corrects an increasing amount or decreasing amount of said fuel injection amount in said transition sate in accordance with said fuel property.

4. A control apparatus for an internal combustion engine according to claim 2, wherein said various sensors include an air-fuel ratio sensor for detecting an air-fuel ratio based on a particular component in an exhaust gas of said internal combustion engine, said control calculating means includes feedback control means for feedback-controlling said fuel injection amount such that said air-fuel ratio becomes a predetermined value, and said fuel property calculating means calculates said fuel property when said fuel injection amount is feedback-controlled.

5. A control apparatus for an internal combustion engine according to claim 3, wherein said various sensors include an air-fuel ratio sensor for detecting an air-fuel ratio based on a particular component in an exhaust gas of said internal combustion engine, said control calculating means includes feedback control means for feedback-controlling said fuel injection amount such that said air-fuel ratio becomes a predetermined value, said fuel property calculating means calculates said fuel property when said fuel injection amount is feedback-controlled, and said parameter correcting means corrects an increasing amount or decreasing amount of said fuel injection amount in said transition sate in accordance with said fuel property.

6. A control apparatus for an internal combustion engine according to claim 4, wherein said parameter correcting means corrects said fuel injection amount when said fuel injection amount is not feedback-controlled.

7. A control apparatus for an internal combustion engine according to claim 1, wherein said control parameter includes an igniting timing for every cylinder of said internal combustion engine.

8. A control apparatus for an internal combustion engine according to claim 7, wherein said various sensors include an air-fuel ratio sensor for detecting an air-fuel ratio based on a particular component in an exhaust gas of said internal combustion engine, said control calculating means includes feedback control means for feedback-controlling said fuel injection amount supplied to said internal combustion engine such that said air-fuel ratio becomes a predetermined value, and said fuel property calculating means calculates said fuel property when said fuel injection amount is feedback-controlled.

9. A control apparatus for an internal combustion engine according to claim 1, wherein said control parameter includes a fuel injection amount supplied to said internal combustion engine, and an igniting timing for every cylinder of said internal combustion engine.

10. A control apparatus for an internal combustion engine according to claim 1, further including fuel property storing means for storing the fuel property calculated by said fuel property calculating means.

11. A control apparatus for an internal combustion engine according to claim 1, wherein said internal combustion engine includes a plurality of cylinders whose ignitions are controlled synchronously with rotation, said combustion state detecting means includes:
  ionic current detecting means mounted to an ignition plug of at least one corresponding cylinder among said plurality of cylinders for detecting an ionic current signal; and
  ionic current processing means for calculating the combustion state amount of said corresponding cylinder from said ionic current signal.

12. A control apparatus for an internal combustion engine according to claim 11, wherein said ionic current processing means includes ionic current component detecting means for detecting an ionic current component based on said ionic current signal, and said ionic current component detecting means inputs said ionic current signal for a predetermined time period after said corresponding cylinder is ignited, and detects a value corresponding to an input level of said ionic current signal as said ionic current component.

13. A control apparatus for an internal combustion engine according to claim 12, wherein said ionic current component comprises a main combustion integrated value of said ionic current signal, and said ionic current processing means calculates said combustion state amount from said main combustion integrated value of said ionic current signal.

14. A control apparatus for an internal combustion engine according to claim 12, wherein said ionic current component comprises a main combustion period based on the ionic current signal of said corresponding cylinder, and said ionic current processing means calculates said combustion state amount from said main combustion period.

15. A control apparatus for an internal combustion engine according to claim 1, wherein said fuel property calculating means includes a combustion variation processing means for statistically processing said combustion state amount under every predetermined condition, and said fuel property is calculated based on a variation amount calculated by said combustion variation processing means.

16. A control apparatus for an internal combustion engine according to claim 15, wherein said combustion state detecting means calculates combustion state amounts during predetermined cycles, said combustion variation processing means calculates, as said variation amount, a standard variation of the combustion state amounts during said predetermined cycle.

17. A control apparatus for an internal combustion engine according to claim 15, wherein said combustion state detecting means calculates combustion state amounts during predetermined cycles, said combustion variation amount processing means calculates, as said variation amount, an average value of the combustion state amounts during said predetermined cycles.

18. A control apparatus for an internal combustion engine according to claim 15, wherein said combustion variation processing means calculates, as said variation amount, a ratio of a difference absolute value between the current time combustion state amount calculated during the current cycle and the last time combustion state amount calculated during the last time cycle, to an average value of said current time combustion state amount and said last time combustion state amount.

19. A control apparatus for an internal combustion engine according to claim 18, wherein said combustion variation processing means calculates said variation amount by integrating said ratio of said difference absolute value to said average value for the number of said predetermined cycles.

20. A control apparatus for an internal combustion engine according to claim 15, wherein said combustion variation processing means calculates, as said variation amount, a deviation between the current time combustion state amount calculated during the current cycle, and a moving average value of combustion state amount calculated daring previous cycles before said current cycle.

* * * * *